(12) United States Patent
Fuse

(10) Patent No.: US 7,698,645 B2
(45) Date of Patent: Apr. 13, 2010

(54) PRESENTATION SLIDE CONTENTS PROCESSOR FOR CATEGORIZING PRESENTATION SLIDES AND METHOD FOR PROCESSING AND CATEGORIZING SLIDE CONTENTS

(75) Inventor: Tohru Fuse, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1000 days.

(21) Appl. No.: 11/070,883

(22) Filed: Mar. 3, 2005

(65) Prior Publication Data

US 2006/0067578 A1    Mar. 30, 2006

(30) Foreign Application Priority Data

Sep. 30, 2004   (JP) .............................. 2004-289363

(51) Int. Cl.
   *G06F 3/00*    (2006.01)
(52) U.S. Cl. ...................... 715/730; 715/731; 715/732
(58) Field of Classification Search ......... 715/730–732, 715/720
   See application file for complete search history.

(56) References Cited

U.S. PATENT DOCUMENTS

| | | | | |
|---|---|---|---|---|
| 5,404,316 A | * | 4/1995 | Klingler et al. | ............. 715/723 |
| 5,574,798 A | * | 11/1996 | Greer et al. | ................. 382/100 |
| 5,650,799 A | * | 7/1997 | Melen | ......................... 345/172 |
| 5,692,176 A | * | 11/1997 | Holt et al. | ...................... 707/5 |
| 5,802,533 A | * | 9/1998 | Walker | ....................... 715/201 |
| 5,973,693 A | * | 10/1999 | Light | ......................... 715/835 |
| 6,014,679 A | * | 1/2000 | Tomioka et al. | ............. 715/201 |
| 6,038,561 A | * | 3/2000 | Snyder et al. | ................... 707/6 |
| 6,072,493 A | * | 6/2000 | Driskell et al. | .............. 715/854 |
| 6,178,417 B1 | * | 1/2001 | Syeda-Mahmood | ............ 707/3 |
| 6,279,017 B1 | * | 8/2001 | Walker | ....................... 715/201 |
| 6,396,500 B1 | * | 5/2002 | Qureshi et al. | .............. 345/473 |
| 6,538,672 B1 | * | 3/2003 | Dobbelaar | .................. 715/810 |
| 6,590,586 B1 | * | 7/2003 | Swenton-Wall et al. | ...... 715/730 |
| 6,701,318 B2 | * | 3/2004 | Fox et al. | ....................... 707/10 |
| 6,774,920 B1 | * | 8/2004 | Cragun | ........................ 715/730 |
| 6,907,562 B1 | * | 6/2005 | Schuetze | ...................... 715/234 |
| 7,058,891 B2 | * | 6/2006 | O'Neal et al. | ................ 715/730 |

(Continued)

FOREIGN PATENT DOCUMENTS

JP       11-242542 A       9/1999

(Continued)

OTHER PUBLICATIONS

Wikipedia, "Standard score", http://web.archive.org/web/20031213112228/en.wikipedia.org/wiki/Standard_score, http://en.wikipedia.org/wiki/Standard_score on Dec. 13, 2003, printout page 1.*

(Continued)

*Primary Examiner*—Weilun Lo
*Assistant Examiner*—William Wong
(74) *Attorney, Agent, or Firm*—Sughrue Mion, PLLC

(57) ABSTRACT

A slide contents processor has a computer, a percentage computer and a categorizing unit. The computer computes a deviation of explanation time of each slide to total explanation time of slides. The percentage computer computes a percentage of objects in the slide based on the number of the objects by type in the slide. The categorizing unit categorizes the slide based on the deviation and the percentage.

23 Claims, 19 Drawing Sheets

U.S. PATENT DOCUMENTS

| | | | | |
|---|---|---|---|---|
| 7,117,453 | B2* | 10/2006 | Drucker et al. | 715/833 |
| 7,171,619 | B1* | 1/2007 | Bianco | 715/206 |
| 7,298,930 | B1* | 11/2007 | Erol et al. | 382/305 |
| 7,383,497 | B2* | 6/2008 | Glenner et al. | 715/231 |
| 7,512,887 | B2* | 3/2009 | Keohane et al. | 715/732 |
| 2002/0028021 | A1* | 3/2002 | Foote et al. | 382/224 |
| 2002/0032677 | A1* | 3/2002 | Morgenthaler et al. | 707/3 |
| 2002/0164151 | A1* | 11/2002 | Jasinschi et al. | 386/69 |
| 2002/0175932 | A1* | 11/2002 | Yu et al. | 345/720 |
| 2002/0196479 | A1* | 12/2002 | Simske | 358/474 |
| 2003/0048291 | A1* | 3/2003 | Dieberger | 345/732 |
| 2003/0072568 | A1* | 4/2003 | Lin et al. | 396/222 |
| 2003/0122863 | A1* | 7/2003 | Dieberger et al. | 345/730 |
| 2003/0126009 | A1* | 7/2003 | Hayashi et al. | 705/10 |
| 2003/0145023 | A1* | 7/2003 | Bennett et al. | 707/205 |
| 2003/0220916 | A1* | 11/2003 | Imaichi et al. | 707/3 |
| 2003/0222890 | A1* | 12/2003 | Salesin et al. | 345/629 |
| 2003/0222900 | A1* | 12/2003 | Schramm-Apple et al. | 345/730 |
| 2004/0001106 | A1* | 1/2004 | Deutscher et al. | 345/838 |
| 2004/0019608 | A1* | 1/2004 | Obrador | 707/104.1 |
| 2004/0095379 | A1* | 5/2004 | Chang et al. | 345/727 |
| 2004/0143598 | A1* | 7/2004 | Drucker et al. | 707/104.1 |
| 2004/0163035 | A1* | 8/2004 | Ariel et al. | 715/500 |
| 2004/0168118 | A1* | 8/2004 | Wong et al. | 715/500.1 |
| 2004/0193672 | A1* | 9/2004 | Samji et al. | 709/200 |
| 2004/0205457 | A1* | 10/2004 | Bent et al. | 715/500 |
| 2005/0102274 | A1* | 5/2005 | Chen | 707/3 |
| 2005/0138570 | A1* | 6/2005 | Good et al. | 715/789 |
| 2005/0158037 | A1* | 7/2005 | Okabayashi et al. | 386/96 |
| 2005/0192924 | A1* | 9/2005 | Drucker et al. | 707/1 |
| 2005/0246650 | A1* | 11/2005 | Yeung et al. | 715/764 |
| 2006/0008789 | A1* | 1/2006 | Gerteis | 434/365 |
| 2007/0168413 | A1* | 7/2007 | Barletta et al. | 709/203 |
| 2007/0219912 | A1* | 9/2007 | Takano et al. | 705/51 |
| 2007/0297643 | A1* | 12/2007 | Uehori et al. | 382/100 |

FOREIGN PATENT DOCUMENTS

| | | |
|---|---|---|
| JP | 2002-109099 A | 4/2002 |
| JP | 2002-304420 A | 10/2002 |

OTHER PUBLICATIONS

"Standardized Scores", http://web.archive.org/web/20031025105236/http://www.gifted.uconn.edu/siegle/research/Normal/Interpret+Raw+Scores.html, http://www.gifted.uconn.edu/siegle/research/Normal/Interpret%20Raw%20Scores.html on Oct. 25, 2003, printout pp. 1-2.*

* cited by examiner

FIG. 3

```
<?xml version="1.0" ?>
<Slide>
 <SlideHeader>
    <Date> <!-- DATE -->
      <Year>2004</Year></Month>5<Day>7</Day>
    </Date>
    <Venue>Kumo</Venue> <!-- PLACE -->
    <Page_number>3</Page_number> <!-- TOTAL NUMBER OF PAGES -->
 </SlideHeader>
 <Page number="1"> <!-- PAGE NUMBER -->
  <PageHeader>
    <StartTime time="13:30:32"></StartTime> <!-- EXPLANATION START TIME -->
    <EndTime time="13:31:05"></EndTime> <!-- EXPLANATION END TIME -->
    <ratio>71.4</ratio> <!-- PERCENTAGE OF TEXT OBJECTS -->
    <ratio>28.6</ratio> <!-- PERCENTAGE OF NON-TEXT OBJECTS -->
  </PageHeader>
  <PageObject>
    <text_item number="5"></text_item> <!-- NUMBER OF TEXT OBJECTS -->
    <graphics_item number="1"></graphics_item> <!-- NUMBER OF GRAPHICS OBJECTS -->
    <image_item number="1"></image_item> <!-- NUMBER OF IMAGE OBJECTS -->
    <video_item number="0"></video_item> <!-- NUMBER OF VIDEO OBJECTS -->
    <audio_item number="0"></audio_item> <!-- NUMBER OF AUDIO OBJECTS -->
    <ref_item number="0"></ref_item> <!-- NUMBER OF REFERENCE OBJECTS -->
  </PageObject>
 </Page>
 <Page number="2">
   ...<!-- SECOND PAGE OBJECT COUNT INFORMATION -->
 </Page>
 <Page number="3">
   ...<!-- THIRD PAGE OBJECT COUNT INFORMATION -->
 </Page>
</Slide>
```

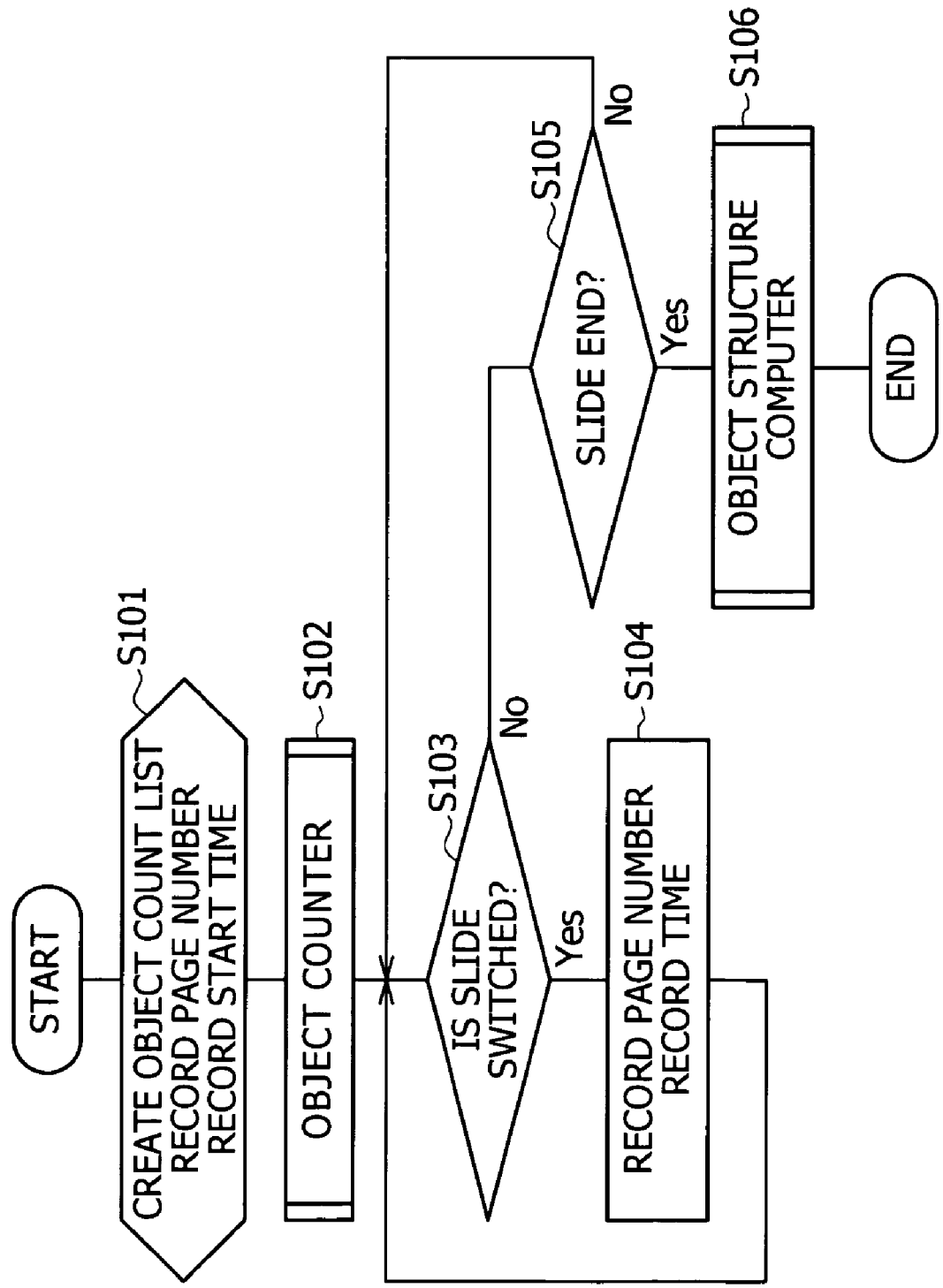

FIG. 7

| SLIDES | | S1 | S2 | S3 | S4 | S5 | S6 | S7 | S8 | S9 | S10 | S11 |
|---|---|---|---|---|---|---|---|---|---|---|---|---|
| | SLIDE NUMBER | | | | | | | | | | | |
| TEXT OBJECTS | NUMBER OF TEXT OBJECTS | 1 | 1 | 5 | 6 | 5 | 14 | 8 | 14 | 29 | 29 | 109 |
| | PERCENTAGE | 50% | 16.7% | 38.5% | 100% | 100% | 35.9% | 19% | 15% | 74.4% | 60.4% | 52.2% |
| NON-TEXT OBJECTS | NUMBER OF NON-TEXT OBJECTS | 1 | 5 | 8 | 0 | 0 | 25 | 34 | 79 | 10 | 19 | 100 |
| | PERCENTAGE | 50% | 83.3% | 61.5% | 0% | 0% | 64.1% | 81% | 85% | 25.6% | 39.6% | 47.8% |

FIG. 8

| SLIDE NUMBER | S1 | S2 | S3 | S4 | S5 | S6 | S7 | S8 | S9 | S10 | S11 |
|---|---|---|---|---|---|---|---|---|---|---|---|
| EXPLANATION TIME (SEC.) | 10 | 15 | 33 | 50 | 40 | 40 | 50 | 125 | 105 | 70 | 90 |
| DEVIATIONS | 34.7 | 38.5 | 43.4 | 48.1 | 45.3 | 45.3 | 48.1 | 68.5 | 63.1 | 53.5 | 59 |

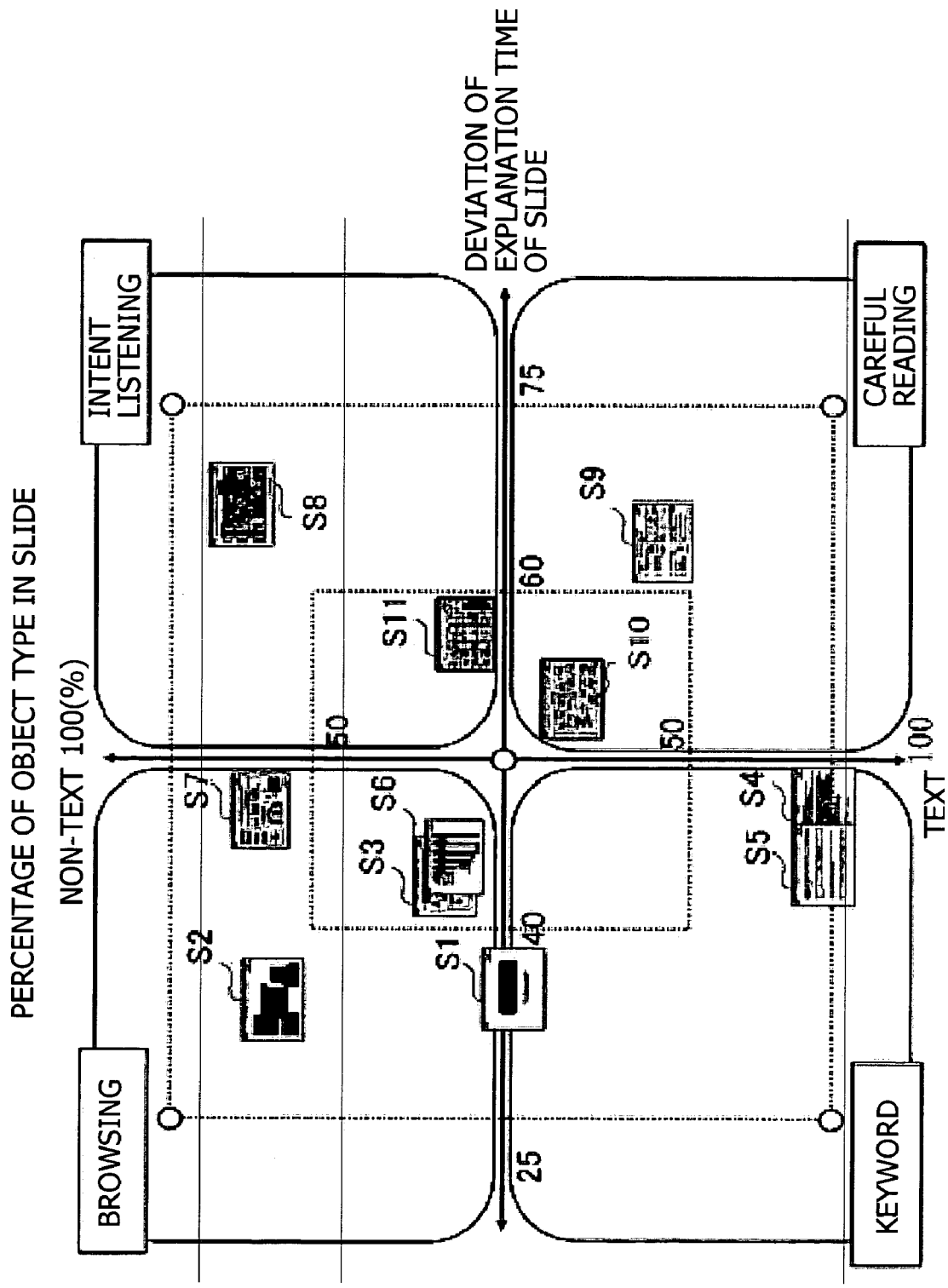

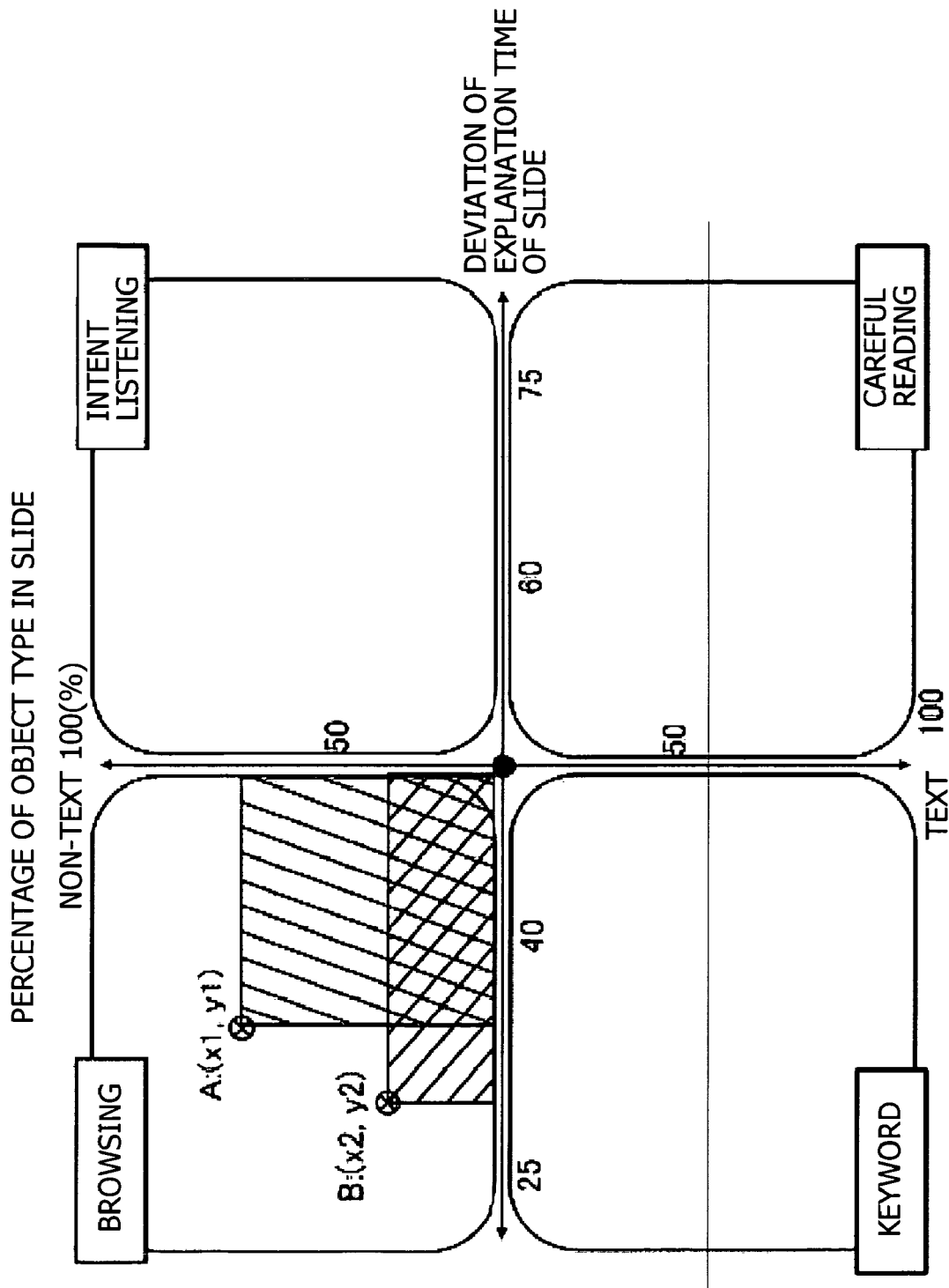

| SLIDE NUMBER | 1 | 2 | 3 | 4 | 5 | 6 | 7 | 8 | 9 | 10 | 11 |
|---|---|---|---|---|---|---|---|---|---|---|---|
| BROWSE TYPES | KEY WORD | BROWSING | BROWSING | KEY WORD | BROWSING | BROWSING | KEY WORD | INTENT LISTENING | CAREFUL READING | CAREFUL READING | INTENT LISTENING |
| SCORES IN BROWSE TYPES | 0 | 2567.1 | 1002.0 | 4806.3 | 4533.3 | 1268.7 | 2975.4 | 1115.1 | 3973.2 | 4790.7 | 254.0 |

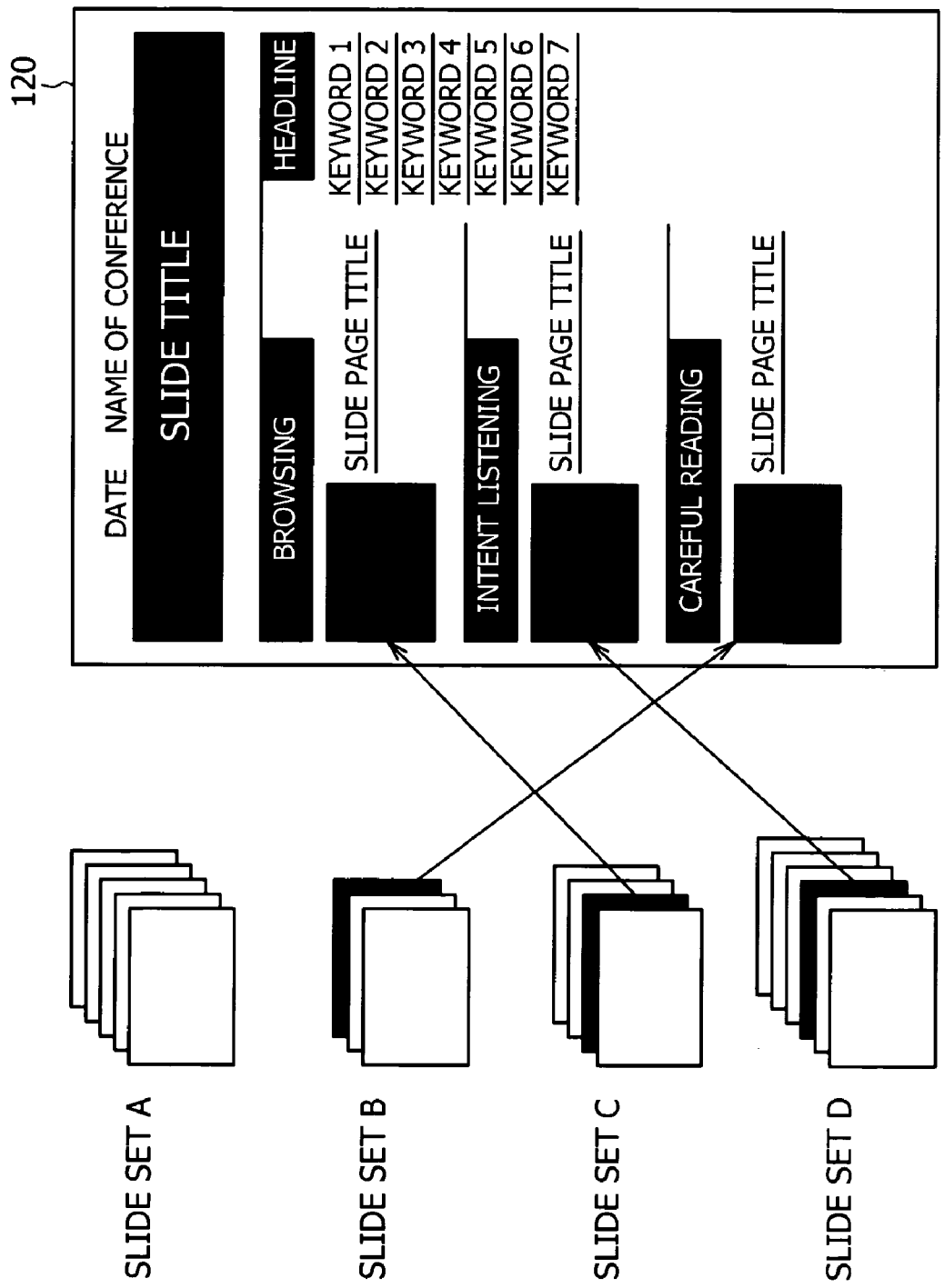

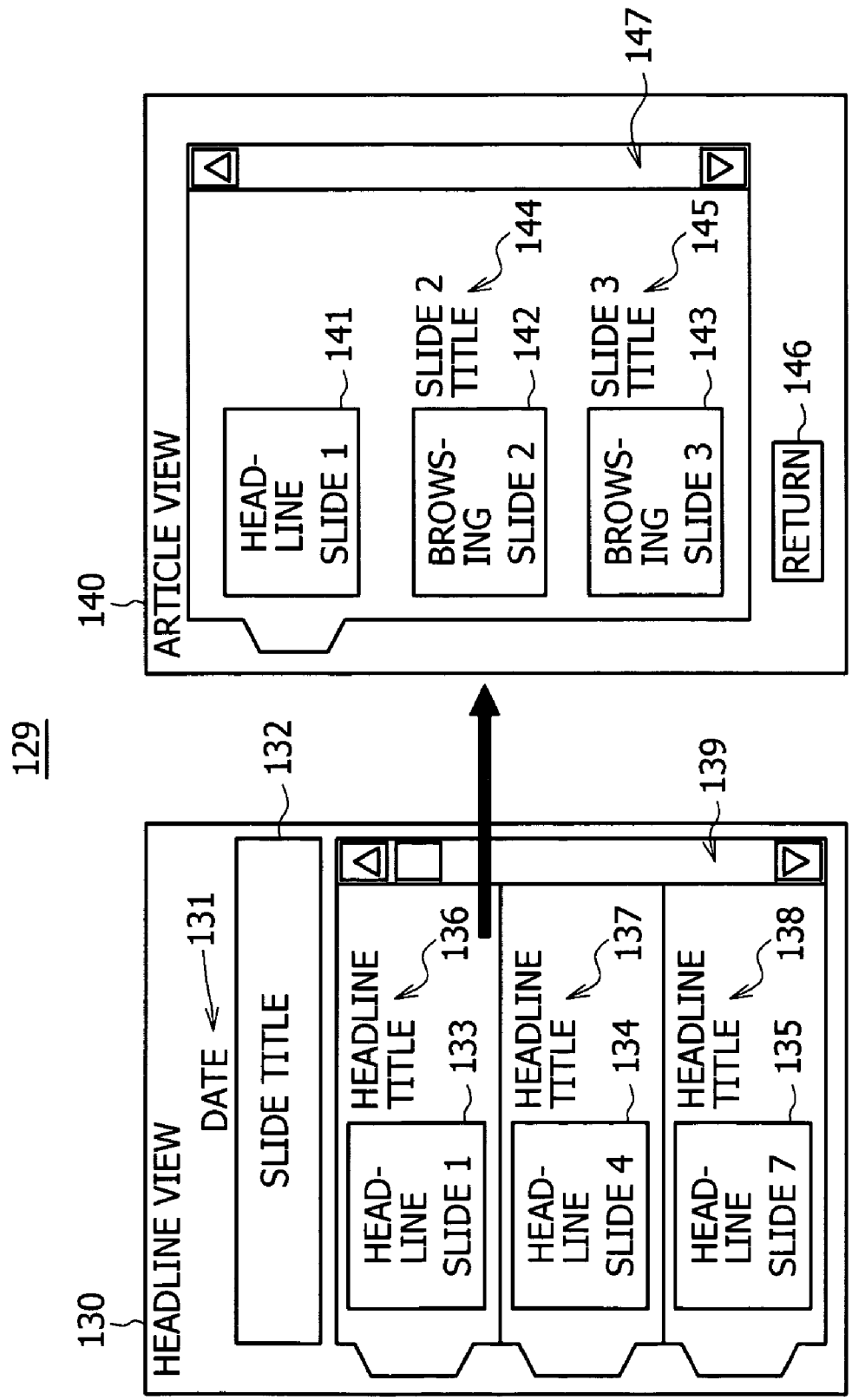

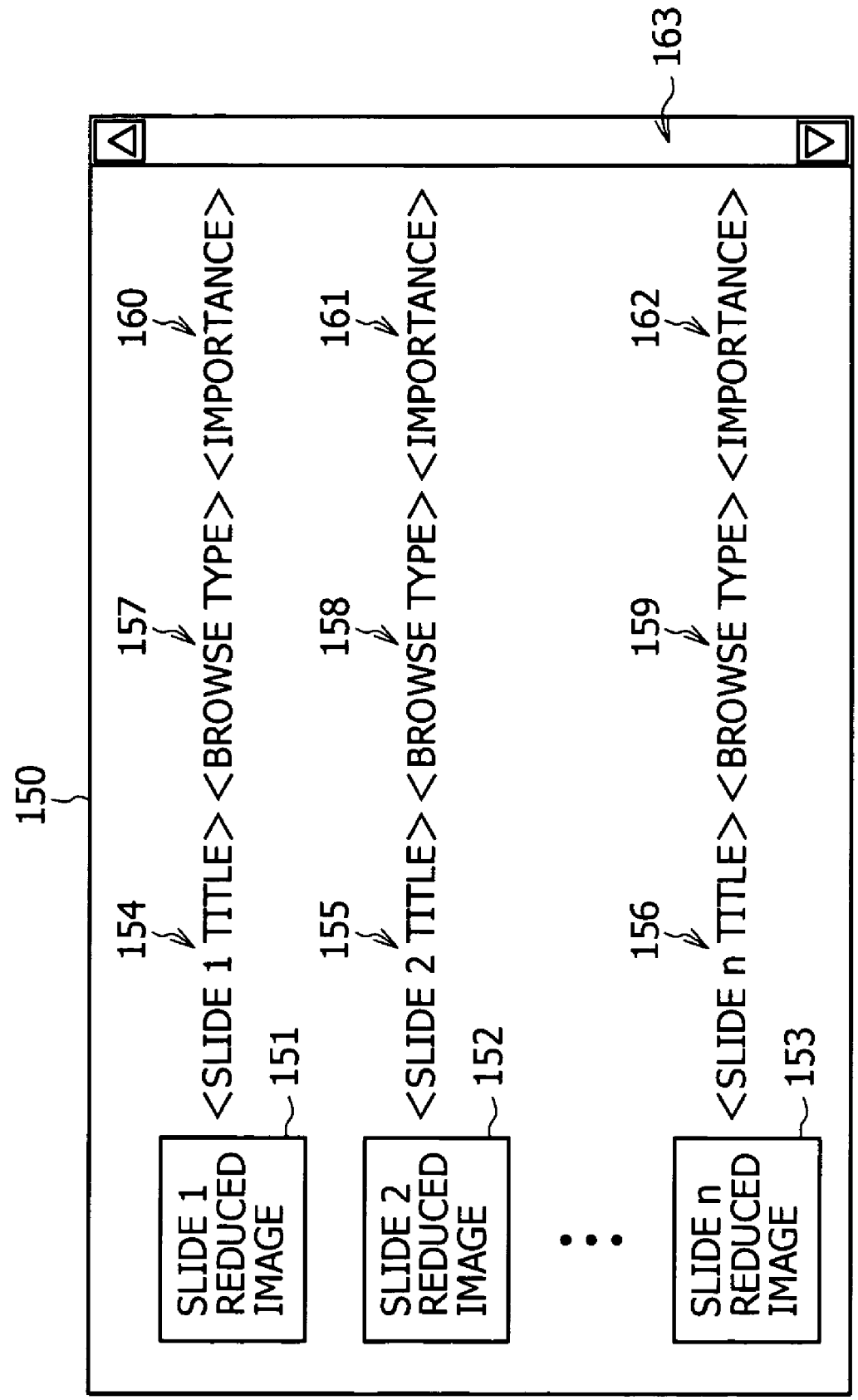

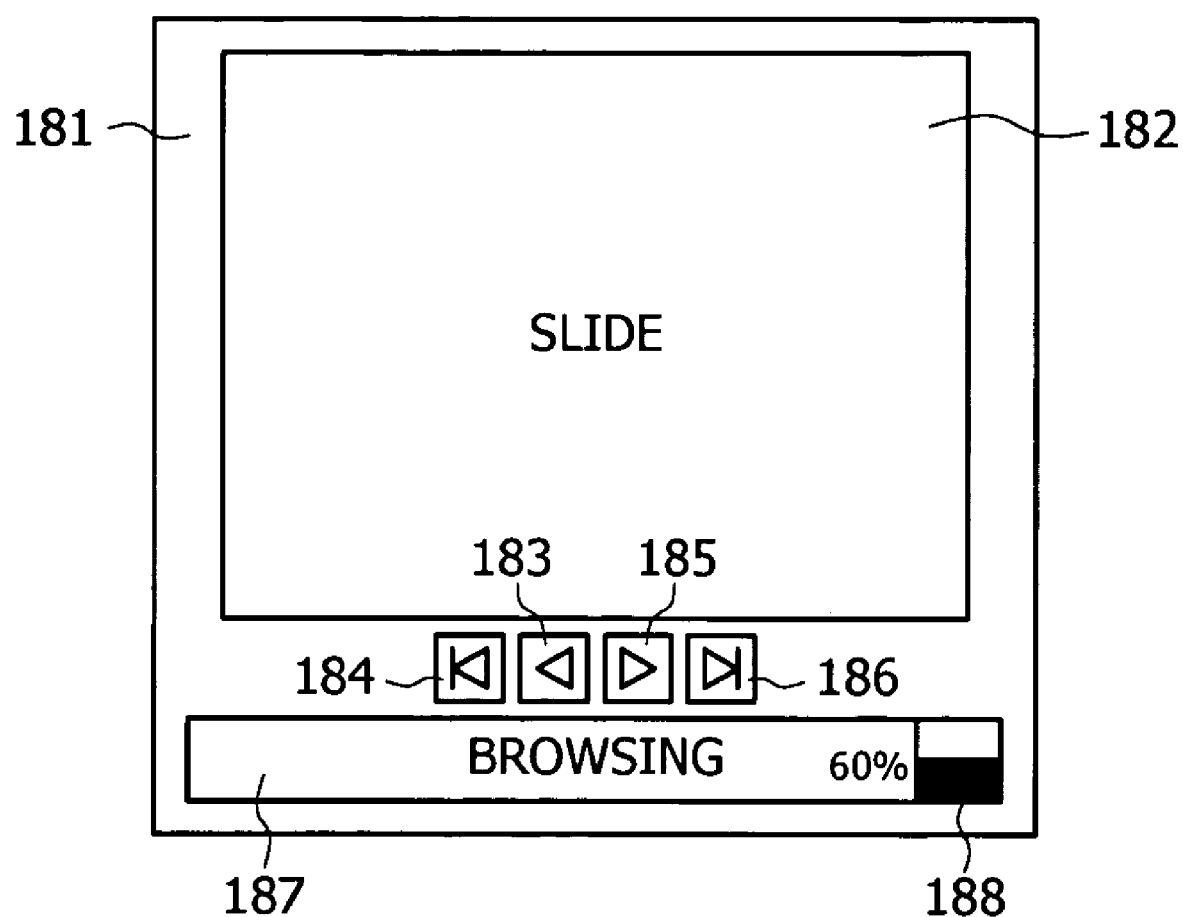

PRESENTATION SLIDE CONTENTS PROCESSOR FOR CATEGORIZING PRESENTATION SLIDES AND METHOD FOR PROCESSING AND CATEGORIZING SLIDE CONTENTS

BACKGROUND OF THE INVENTION

1. Field of the Invention

The present invention relates to a slide contents processor, slide contents processing method, and program.

2. Description of the Related Art

There has been proposed a technique for assisting a conference or presentation in such a manner that in the conference or presentation using slides as material, slides by page included in the material and audios discussing or explaining them are recorded, and a person who has not taken part in the conference listens to the audios and views the contents of the conference while browsing the slide or a person who has not taken part in the presentation listens to the audios and views the contents of the presentation while browsing the slide. The following patent documents have been proposed.

A display device described in Japanese Published Unexamined Patent Application No. Hei 11-242542 creates a representative drawing which can easily grasp the contents of multimedia data and displays the summary using the created representative drawing. A system described in Japanese Published Unexamined Patent Application No. 2002-109099 records material used for a presentation in a conference associated with videos and audios explaining the material and replays the material in synchronization with the videos and audios. A system described in Japanese Published Unexamined Patent Application No. 2002-304420 delivers contents so that a client can view the scene of a desired session part.

In the method of Related Art, the contents cannot be grasped unless slides used for a presentation are successively viewed. It takes about the same time as when a conference or presentation is actually performed. The display device described in Japanese Published Unexamined Patent Application No. Hei 11-242542 cannot find, with a representative drawing, a slide the user looks for.

In the system described in Japanese Published Unexamined Patent Application No. 2002-109099, a desktop PC is necessary for browsing videos, slides and audios recorded into a server to look back upon the contents of a conference. It is difficult to browse them outside the office. It is also difficult to secure enough time to browse previous conference data in the office. In the system described in Japanese Published Unexamined Patent Application No. 2002-304420, the scene of a desired session part is hard to search for.

SUMMARY OF THE INVENTION

The present invention has been made in view of the above problems and provides a slide contents processor, slide contents processing method, and program which can efficiently view a slide in a short time.

To address the above problems, a slide contents processor according to the present invention includes a computer that computes a deviation of explanation time of each slide to total explanation time of slides; a percentage computer that computes a percentage of objects in the slide based on the number of the objects by type in the slide; and a categorizing unit that categorizes the slide based on the deviation of explanation time of the slide and the percentage of the objects in the slide. According to an embodiment of the invention, the slide is categorized based on the deviation of explanation time of the slide and the percentage of the objects in the slide. A viewer can efficiently browse the slide in a short time.

BRIEF DESCRIPTION OF THE DRAWINGS

Embodiments of the present invention will be described in detail based on the following figures, wherein:

FIG. 3 is a diagram showing an example of an object count list;

FIG. 4 is a processing flowchart of presentation recording;

FIG. 7 is a diagram of assistance in explaining the percentages of objects by slide;

FIG. 8 is a diagram showing an example of explanation time by slide and their deviations;

FIG. 11 is a diagram showing a categorizing example based on the contents of a slide;

FIG. 12 is a diagram showing a method of deciding the slide selection order in the same quadrant;

FIG. 17 is a diagram showing an example in which plural sets of slides are laid out;

FIG. 18 is a diagram showing an example of a structuring slide view;

FIG. 19 is a diagram of assistance in explaining an example in which recommendation of a viewing method is added to a slide list; and FIG. 20 is a diagram showing an example of a browse viewer recommending a browsing method at browsing of presentation recording recorded by a presentation recorder.

DETAILED DESCRIPTION OF THE INVENTION

Figure 1:
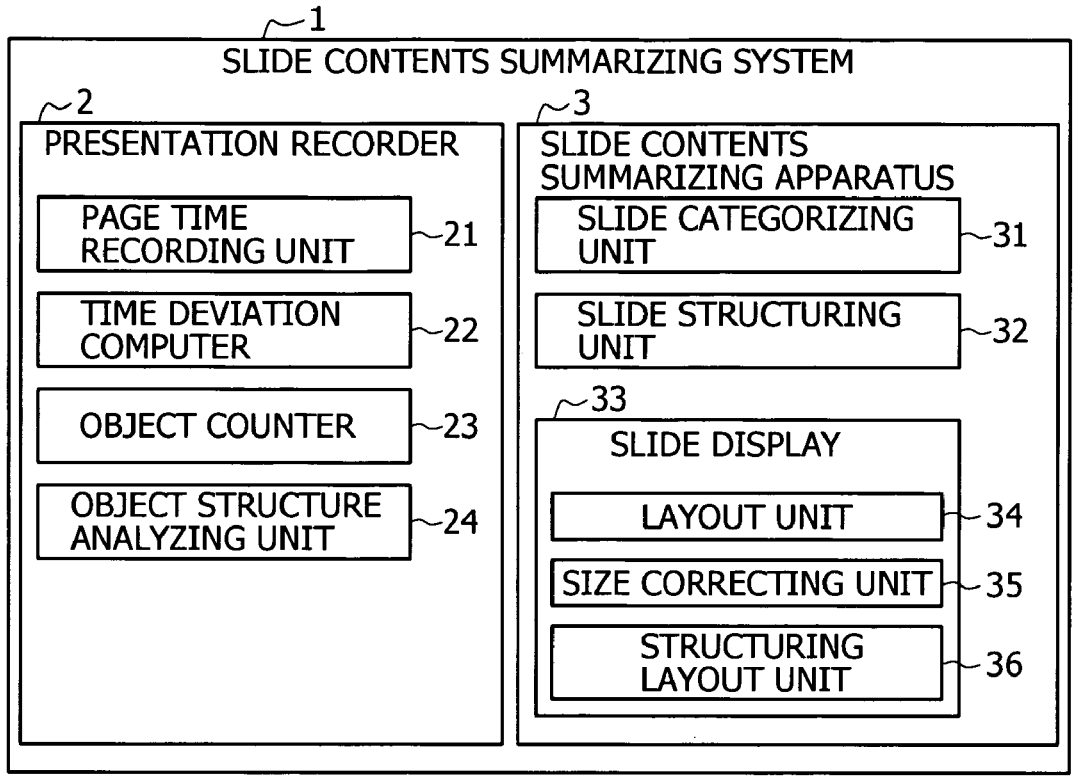
FIG. 1 is a diagram showing the overall configuration of a slide contents summarizing system according to this embodiment.

Embodiments of the present invention will be described below. FIG. 1 is a diagram showing the overall configuration of a slide contents summarizing system (slide contents processor) according to this embodiment. As shown in FIG. 1, a slide contents summarizing system 1 has a presentation recorder 2 and a slide contents summarizing apparatus 3. The slide contents summarizing system 1 can be configured using a CPU (Central Processing Unit), a ROM (Read Only Memory), a RAM (Random Access Memory), and an image processor.

The presentation recorder 2 records an image and an audio in a presentation to store them as files. The slide contents summarizing apparatus 3 displays a summarized slide. The presentation recorder 2 has a page time recording unit 21, a time deviation computer 22, an object counter 23, and an object structure computer 24. A slide has a single page or plural pages.

The page time recording unit 21 automatically records explanation time of each slide by page in a presentation. The page time recording unit 21 automatically stores, by page, explanation time of the first page slide of "10 sec.", explanation time of the second page slide of "15 sec.", explanation time of the third page slide of "33 sec.", explanation time of the fourth page slide of "125 sec.". The page time recording unit 21 detects slide switching to specify explanation start time and explanation end time of each slide. The difference between the explanation end time and the explanation start time of the slide is explanation time of the slide.

The time deviation computer 22 computes the deviation of explanation time of each slide from the explanation time of the slide by page recorded by the page time recording unit 21 to total explanation time of all slides. The object counter 23 counts the number of objects included in each slide by page by object type to record it into an object count list. The object type includes text, image and graphics.

The object structure computer 24 computes the percentage of objects in each slide based on the number of objects by type in the slide counted by the object counter 23 to analyze the structure of objects by slide. The object structure computer 24 categorizes a slide as text, image, graphics, table, video or audio to compute the percentage to the total number of objects in the same page. An example in which the object structure computer 24 computes the percentages of text objects and non-text objects will be described below.

The slide contents summary apparatus 3 has a slide categorizing unit 31, a slide structuring unit 32, and a slide display 33. The slide categorizing unit 31 categorizes a slide by page based on the deviation of explanation time of each slide and the percentage of objects of the slide. The slide categorizing unit 31 categorizes a slide as "browsing", "careful reading", "intent listening", and "keyword" based on explanation time and the number of objects of each slide. The slide categorizing unit 31 computes browse type and a score of the browse type.

When viewing a slide, the browse type suggests four viewing methods: "mainly seeing visuals", "mainly reading text", "mainly listening to explanation", and "quick reading". In this embodiment, a slide of the type "mainly seeing visuals" is called "browsing". The expression such as "mainly seeing visuals", "seeing", and "thorough seeing" may be used. The slide of the type "mainly reading text" is called "careful reading". The expression such as "mainly reading text", "reading", and "thorough reading" may be used. The slide of the type "mainly listening to explanation" is called "intent listening" The expression such as "mainly listening to explanation", "listening", and "thorough listening" may be used. The slide of the type "quick reading" is called "keyword". The expression such as "quick reading", "scanning", and "skimming" may be used.

A score in the browse type means importance of a slide in each browse type by slide included in the browse type. The product of the deviation of each slide computed by the time deviation computer 22 and the difference between the percentages of objects included in slides computed by the object structure-analyzing unit 24 is computed so that its absolute value is a score in the browse type.

The slide structuring unit 32 structures a slide and creates a headline list and an article list based on browse type and a score in the browse type computed by the slide categorizing unit 31. The headline list and the article list will be described later.

The slide display 33 has a layout unit 34, a size correcting unit 35, and a structuring layout unit 36. The slide display 33 generates information for arranging and displaying the contents of a slide by item categorized by the slide categorizing unit 31. The contents of the slide are the reduced image of the slide and the title of the slide. The slide display 33 displays the headline of an item categorized by the slide categorizing unit 31. The headlines of the items are browsing, careful reading, intent listening, and keyword.

The layout unit 34 arranges the slide categorized by the slide categorizing unit 31 by a layout having high listing ability such as newspaper. The size correcting unit 35 performs change of a layout, addition display of a slide, and addition display of summary of the contents to the slide in accordance with the screen size of the display device. The structuring layout unit 36 generates information for displaying structuring slide view displaying a slide in a structure manner using a slide structured by the slide structuring unit 32.

Figure 2:
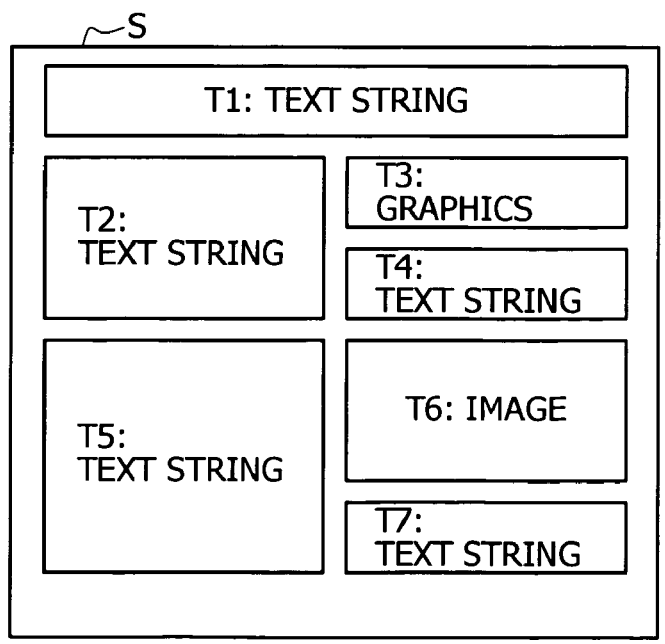
FIG. 2 is a diagram showing an object arrangement example in a slide page.

An object arrangement example in a slide page will be described. FIG. 2 is a diagram showing an object arrangement example in a slide page. In FIG. 2, S denotes a slide page and T denotes an object in the slide page S. The slide page S includes objects of a text string (text) T1, a text string T2, a graphic T3, a text string T4, a text string T5, an image T6, and a text string T7.

The object count list will be described. FIG. 3 is a diagram showing an example of the object count list. As shown in FIG. 3, an object count list 40 includes date, place, the total number of pages, page number, explanation start time, explanation end time, the percentage of text objects, the percentage of non-text objects, the number of text objects, the number of graphics objects, the number of image objects, the number of video objects, the number of audio objects, the number of reference objects, count information of the second page object, and count information of the third page object. The number of text objects, the number of graphics objects, the number of image objects, the number of video objects, the number of audio objects, and the number of reference objects are described by the object counter 23.

The percentage of text objects and the percentage of non-text objects are described by the object structure computer 24. FIG. 3 is an example in which the object count list 40 is described by XML (eXtensible Markup Language). One object count list 40 is created by plural slides. The example shown in FIG. 3 shows the first page slide portion in detail. An OS (Operating System) extracts the contents of a presentation when starting an application for viewing the contents of a presentation to create a library. The object counter 23 extracts object information from the library to make it into the XML form. The object count list 40 as shown in FIG. 3 is created.

Presentation recording processing will be described. FIG. 4 is a processing flowchart of presentation recording. In step S101, the page time recording unit 21 creates the object count list 40, records a page number into the object count list 40, and records explanation start time. The page number is recorded starting the first page. In step S102, the object counter 23 counts and records the number of objects included in each slide by object type. In step S103, the page time recording unit 21 judges whether the slide is switched or not. When switching the first page slide to the second page slide, the slide is judged to be switched.

The page time recording unit 21 advances to step S104 when judging in step S103 that the slide is switched, records the page number into the object count list 40, and records explanation end time to return to step S103. The page time recording unit 21 advances to step S105 when judging in step S103 that the slide is not switched, judges whether slide end or not, and advances to step S103 at slide end. When judging in step S103 that the slide is switched, the object structure computer 24 in step S106 computes the percentage to the total number of objects in the same page based on the number of objects counted by the object counter 23 to analyze the object structure by slide.

Figure 5:
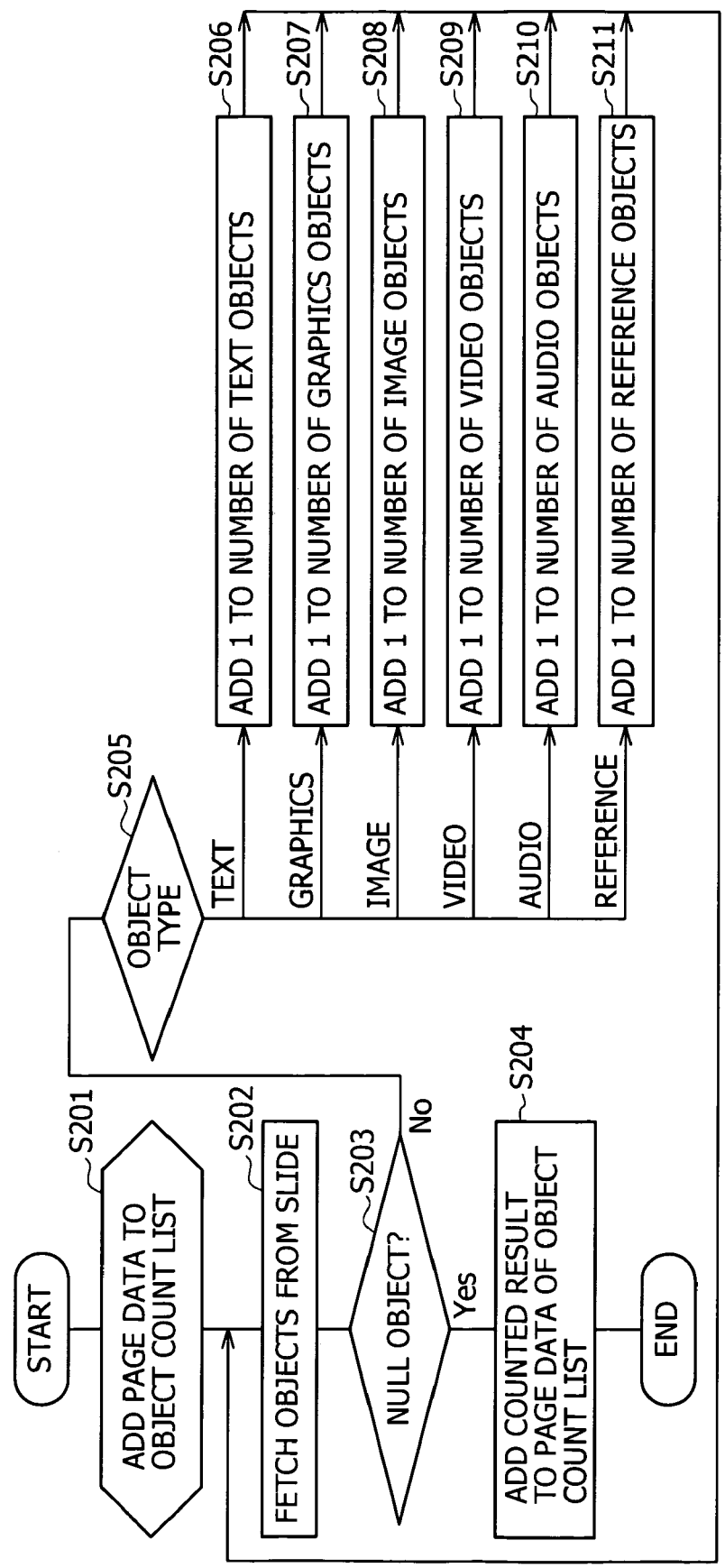
FIG. 5 is a flowchart of an object counter.

The processing of the object counter 23 in step S102 will be described. FIG. 5 is a processing flowchart of the object counter 23. In step S201, the object counter 23 adds page data to the object count list 40. In step S202, the object counter 23 fetches objects from the slide.

The object counter 23 advances to step S205 when judging not a null object in step S203, and judges an object type. In the case of a text object, the object counter 23 adds "1" to the number of text objects in step S206. In the case of a graphics object, the object counter 23 adds "1" to the number of graphics objects in step S207. In the case of an image object, the object counter 23 adds "1" to the number of image objects in step S208. In the case of a video object, the object counter 23 adds "1" to the number of video objects in step S209. In the case of an audio object, the object counter 23 adds "1" to the number of audio objects in step S210. In the case of a reference object, the object counter 23 adds "1" to the number of reference objects in step S211.

The object counter 23 increments the number of text objects, the number of graphics objects, the number of image objects, the number of video objects, the number of audio objects, and the number of reference objects of the object count list 40 shown in FIG. 3. In step S203, the object counter 23 judges whether a null object or not. In the case of a null object, the object counter 23 adds a counted result to page data of the object count list 40 in step S204 to end the processing.

Figure 6:
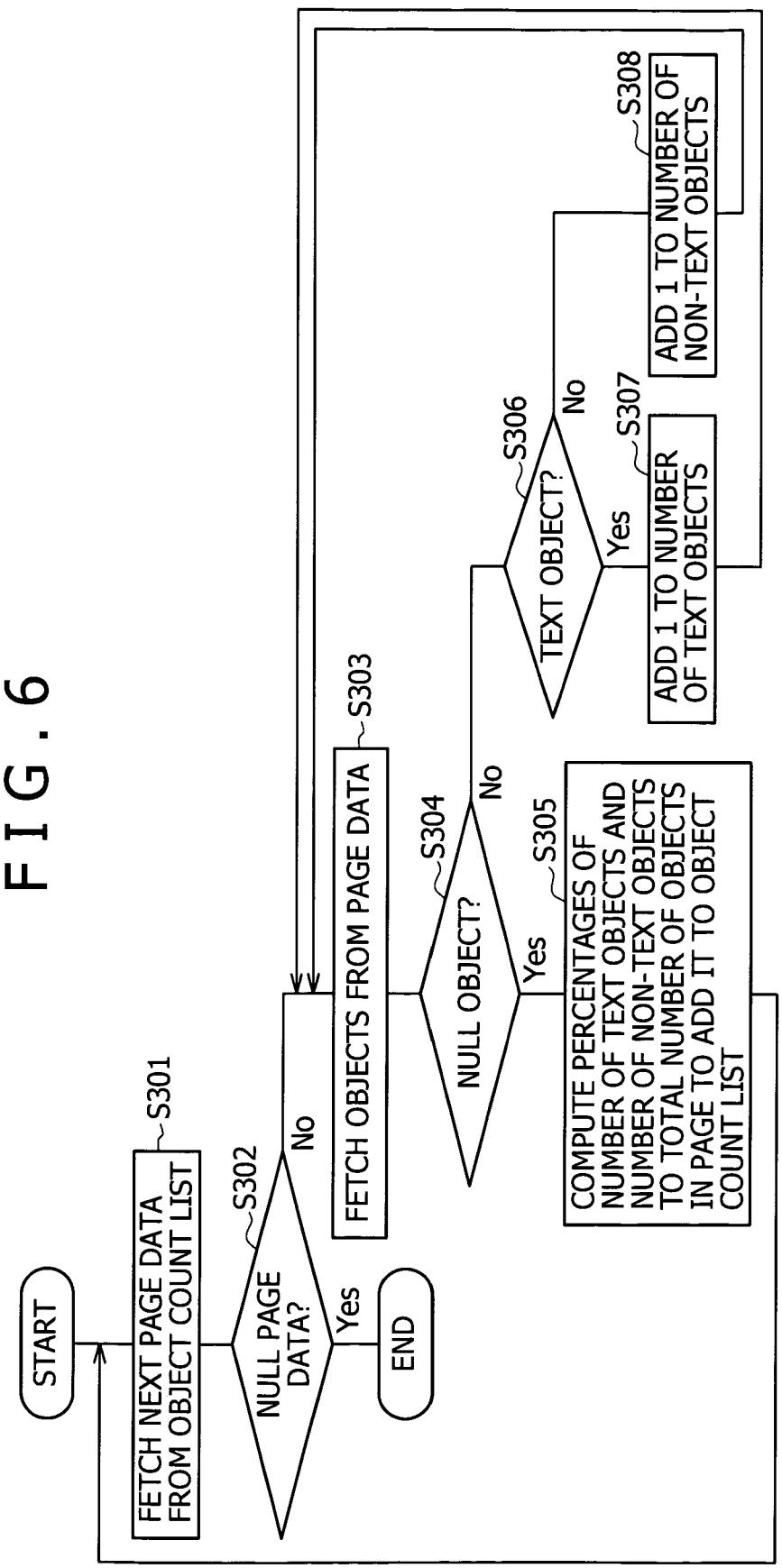
FIG. 6 is a processing flowchart of an object structure computer.

The processing of the object structure computer 24 in step S106 will be described. FIG. 6 is a processing flowchart of the object structure computer 24. In step S301, the object structure computer 24 fetches the next page data from the object count list 40. In step S302, the object structure computer 24 judges whether null page data or not. When judging null page data, the object structure computer 24 ends the processing. When judging not null page data, the object structure computer 24 advances to step S303. In step S303, the object structure computer 24 fetches objects from the page data.

In step S304, the object structure computer 24 judges whether a null object or not. When judging a null object, in step S305, the object structure computer 24 computes the percentages of the number of text objects and the number of non-text objects to the total number of objects in the page to add the percentage of the objects to the object count list 40. In step S304, when judging not a null object, the object structure computer 24 judges whether a text object or not in step S306. When judging a text object, the object structure computer 24 adds "1" to the number of text objects in step S307 to return to step S303.

When judging a text object in step S306, the object structure computer 24 adds "1" to the number of non-text objects in step S308 to return to step S303 for computing the percentage of the objects of each slide to all the slide pages.

FIG. 7 is a diagram of assistance in explaining the percentage of objects by slide. The percentages to the total number of objects in the same page computed by the object structure computer 24 based on the number of objects counted by the object counter 23 will be shown below. As shown in FIG. 7, the slide S1 includes one text object and one non-text object in a page. The percentage of text objects is "50%" and the percentage of non-text objects is "50%".

The slide S2 includes one text object and five non-text objects in a page. The percentage of text objects is about "16.7%" and the percentage of non-text objects is about "83.3%". The slide S3 includes five text objects and eight non-text objects in a page. The percentage of text objects is about "38.5%" and the percentage of non-text objects is about "61.5%". The slide S4 includes six text objects in a page. The percentage of text objects is "100%".

The slide S5 includes five text objects in a page. The percentage of text objects is "100%". The slide S6 includes 14 text objects and 25 non-text objects in a page. The percentage of text objects is about "35.9%" and the percentage of non-text objects is about "64.1%". The slide S7 includes eight text objects and 34 non-text objects in a page. The percentage of text objects is about "19%" and the percentage of non-text objects is about "81%".

The slide S8 includes 14 text objects and 79 non-text objects in a page. The percentage of text objects is about "15%" and the percentage of non-text objects is about "85%". The slide S9 includes 29 text objects and ten non-text objects in a page. The percentage of text objects is about "74.4%" and the percentage of non-text objects is about "25.6%". The slide S10 includes 29 text objects and 19 non-text objects in a page. The percentage of text objects is about "60.4%" and the percentage of non-text objects is about "39.6%".

The slide S11 includes 109 text objects and 100 non-text objects in a page. The percentage of text objects is about "52.2%" and the percentage of non-text objects is about "47.8%". Examples of the percentages of text objects and non-text objects are described above. When computing the percentage to the total number of objects in the same page, the object structure computer 24 may categorize a slide as text, image, graphics, table, video, and audio to compute the percentage to the total number of objects in the same page.

FIG. 8 is a diagram showing an example of explanation time by slide and their deviations. The time deviation computer 22 computes the deviation of explanation time of each slide from explanation time of a slide by page recorded by the page time recording unit 21 to the total explanation time of all the slides. FIG. 8 shows the slide number of each slide, explanation time by slide, and a deviation by slide. The time deviation computer 22 obtains a deviation from ((explanation time−average explanation time)/standard deviation)×10+50. As shown in FIG. 8, in the slide S1, explanation time is "10 sec." and a deviation is "34.7". In the same manner, the deviation of each slide is computed to the slides S2 to S11.

A categorizing example based on the contents of a slide will be described. FIG. 11 is a diagram showing a categorizing example based on the contents of a slide. The slide categorizing unit 31 maps each slide on a graph in which the horizontal axis indicates the deviation of explanation time of a slide and the vertical axis indicates the percentage by object type in a slide, based on the deviation of explanation time of each slide and the percentage of objects in the slide.

Specifically, the slide categorizing unit 31 assigns the deviation of explanation time of each slide computed by the time deviation computer 22 so that, with the origin of 50, the high deviation is assigned in a positive direction and the low deviation is assigned in a negative direction, computes the difference between the percentage of text objects and the percentage of non-text objects of each slide computed by the object structure computer 24, and assigns, with the origin of 0, text objects to one pole and non-text objects to the other pole.

The slide categorizing unit 31 categorizes, in the slide, to four quadrants of a two-dimensional plane constituted of two axes of the deviation of explanation time of the slide and the percentage of objects in the slide, a quadrant in which the deviation of explanation time of the slide is positive seen from the origin and the percentage of objects in the slide belongs to text as "careful reading", a quadrant in which the deviation of explanation time of the slide is positive seen from the origin and the percentage of objects in the slide belongs to non-text as "intent listening", a quadrant in which the deviation of explanation time of the slide is negative seen from the origin and the percentage of objects in the slide belongs to text as "keyword" or a quadrant in which the deviation of explanation time of the slide is negative seen from the origin and the percentage of objects in the slide belongs to non-text as "browsing" The slide categorizing unit 31 computes the product of the deviation by slide computed by the time deviation computer 22 and the difference between the percentages of objects included in each slide computed by the object structure analyzing unit 24 so that its absolute value is a score of each slide.

The intent listening refers to listening carefully or listening attentively. A slide whose explanation time is long and percentage of figures or pictures is high is categorized as the intent listening. The careful reading refers to reading even a detailed part with care. A slide whose explanation time is long and percentage of text is high is categorized as the careful reading. The browsing refers to checking books and documents. A slide whose explanation time is short and percentage of figures or pictures is high is categorized as the browsing. A slide whose explanation time is short and percentage of text is high often includes a keyword and is categorized as the keyword.

Figure 9:
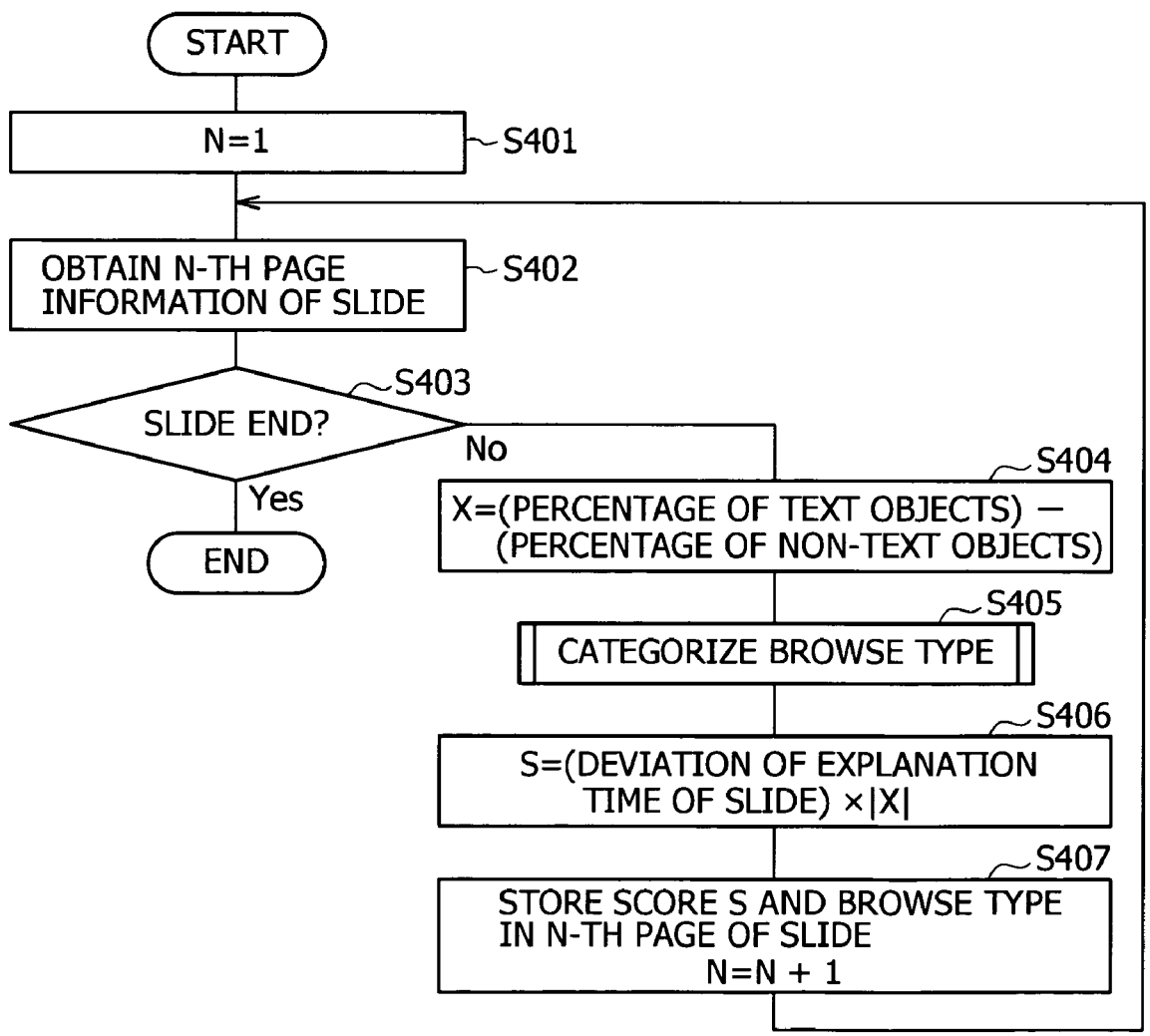
FIG. 9 is a flowchart of a slide categorizing unit.

FIG. 9 is a processing flowchart of the slide categorizing unit 31. In step S401, the slide categorizing unit 31 starts the processing from N=1. In step S402, the slide categorizing unit 31 obtains information of the N-th page of a slide from the presentation recorder 2. When not slide end in step S403, the slide categorizing unit 31 computes X=(the percentage of text objects)−(the percentage of non-text objects) in step S404. In step S405, the slide categorizing unit 31 performs browse type categorizing processing. In step S406, the slide categorizing unit 31 computes the score S in the N-th page of the slide=(the deviation of explanation time of slide)×|X|. In step S407, the slide categorizing unit 31 stores the score S in the N-th page of the slide and browse type to increment N by one for returning to step S402. At slide end in step S403, the slide categorizing unit 31 ends the processing.

Figure 10:
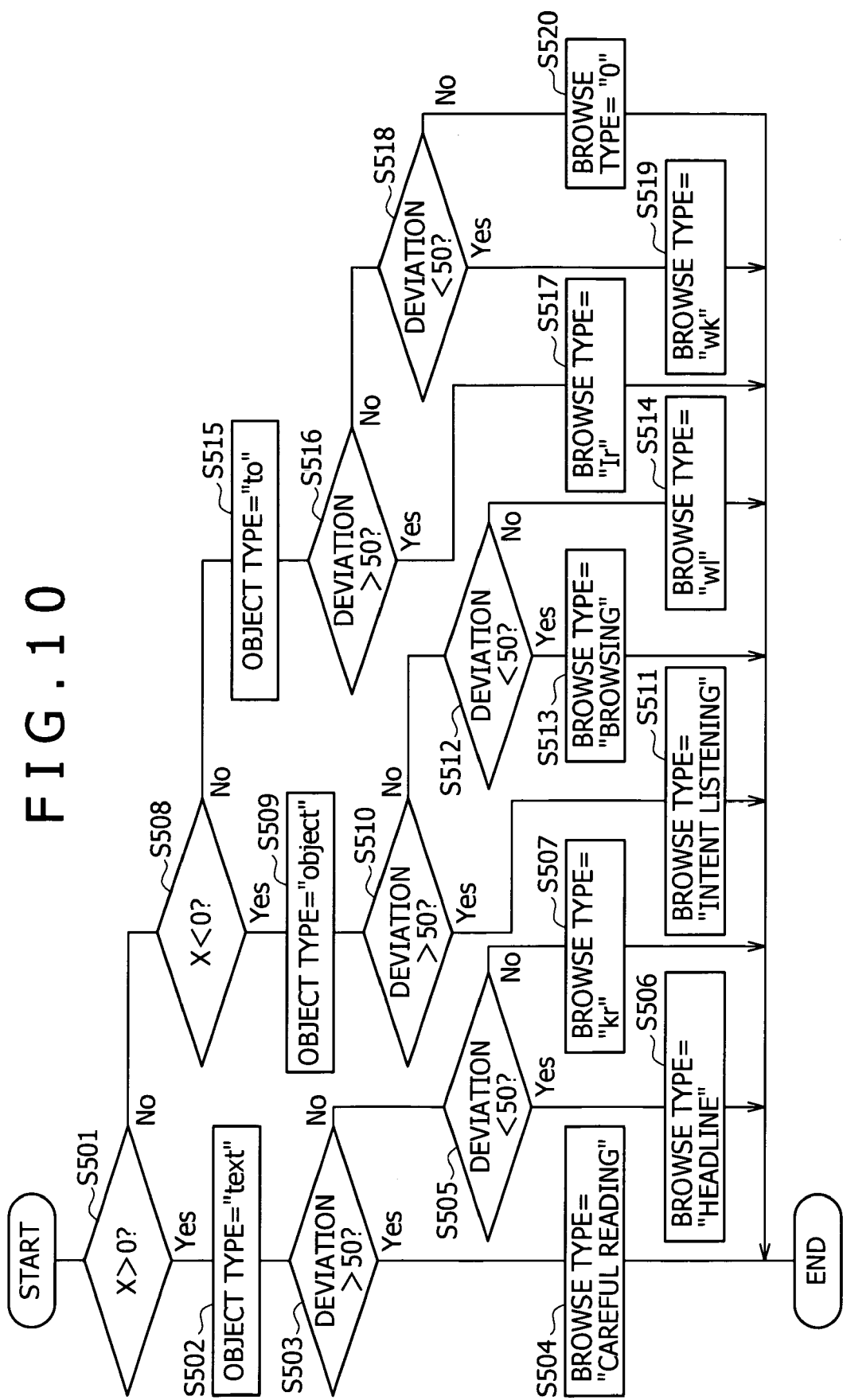
FIG. 10 is a flowchart at browse type categorization of the slide categorizing unit.

FIG. 10 is a processing flowchart at browse type categorizing of the slide categorizing unit 31 in step S405. As described above, the browse type includes careful reading, intent listening, and browsing. When X>0 in step S501, the slide categorizing unit 31 categorizes the object type as "text" in step S502. When the deviation of explanation time of slide >50 in step S503, the slide categorizing unit 31 categorizes the browse type of slide as "careful reading" in step S504. When not the deviation of explanation time of slide >50 in step S503, the slide categorizing unit 31 advances to step S505. When the deviation of explanation time of slide <50, the slide categorizing unit 31 categorizes the browse type of the slide as "headline" in step S506. When the deviation of explanation time of slide =50 in step S505, the slide categorizing unit 31 categorizes the browse type of slide as "kr" in step S507. When not X>0 in step S501, the slide categorizing unit 31 advances to step S508. When X<0, the slide categorizing unit 31 categorizes the object type as "object" in step S509. When the deviation of explanation time of slide >50 in step S510, the slide categorizing unit 31 categorizes the browse type of slide as "intent listening" in step S511.

When not the deviation of explanation time of slide >50 in step S510 and when the deviation of explanation time of slide <50 in step S512, the slide categorizing unit 31 categorizes the browse type as "browsing" in step S513. When the deviation of explanation time of slide=50 in step S512, the slide categorizing unit 31 categorizes the browse type of slide as "wl". When not X<0 in step S508, the slide categorizing unit 31 categorizes the object type as "to" in step S515. When the deviation of explanation time of slide >50 in step S516, the slide categorizing unit 31 categorizes the browse type of slide as "lr" in step S517. When not the deviation of explanation time of slide >50 in step S516 and when the deviation of explanation time of slide <50 in step S518, the slide categorizing unit 31 categorizes the browse type of slide as "wk" in step S519. When not the deviation of explanation time of slide <50 in step S518, the slide categorizing unit 31 categorizes the browse type of slide as "0" in step S520.

Figure 14:
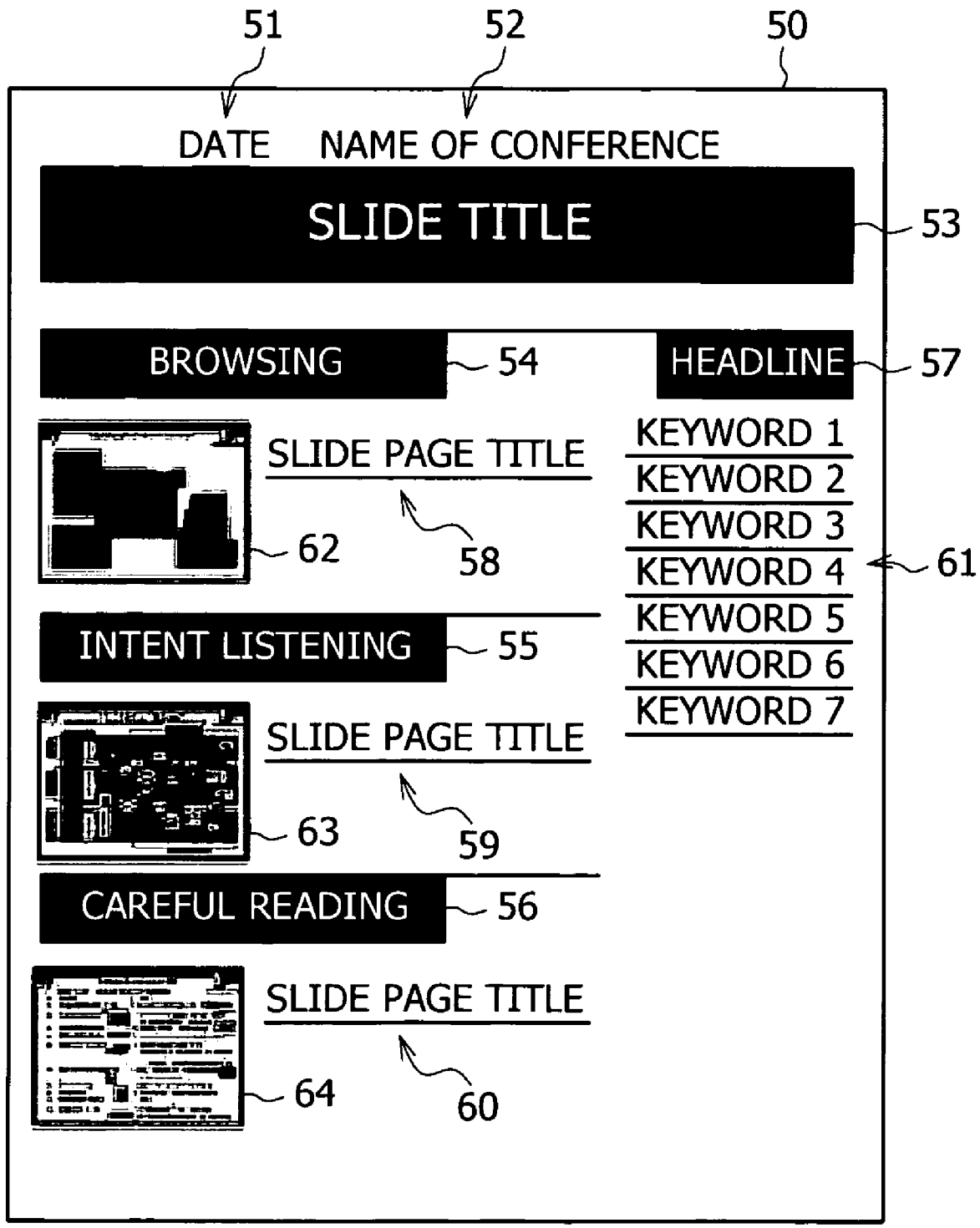
FIG. 14 is a diagram showing an example of a layout in horizontal writing.
Figure 15:
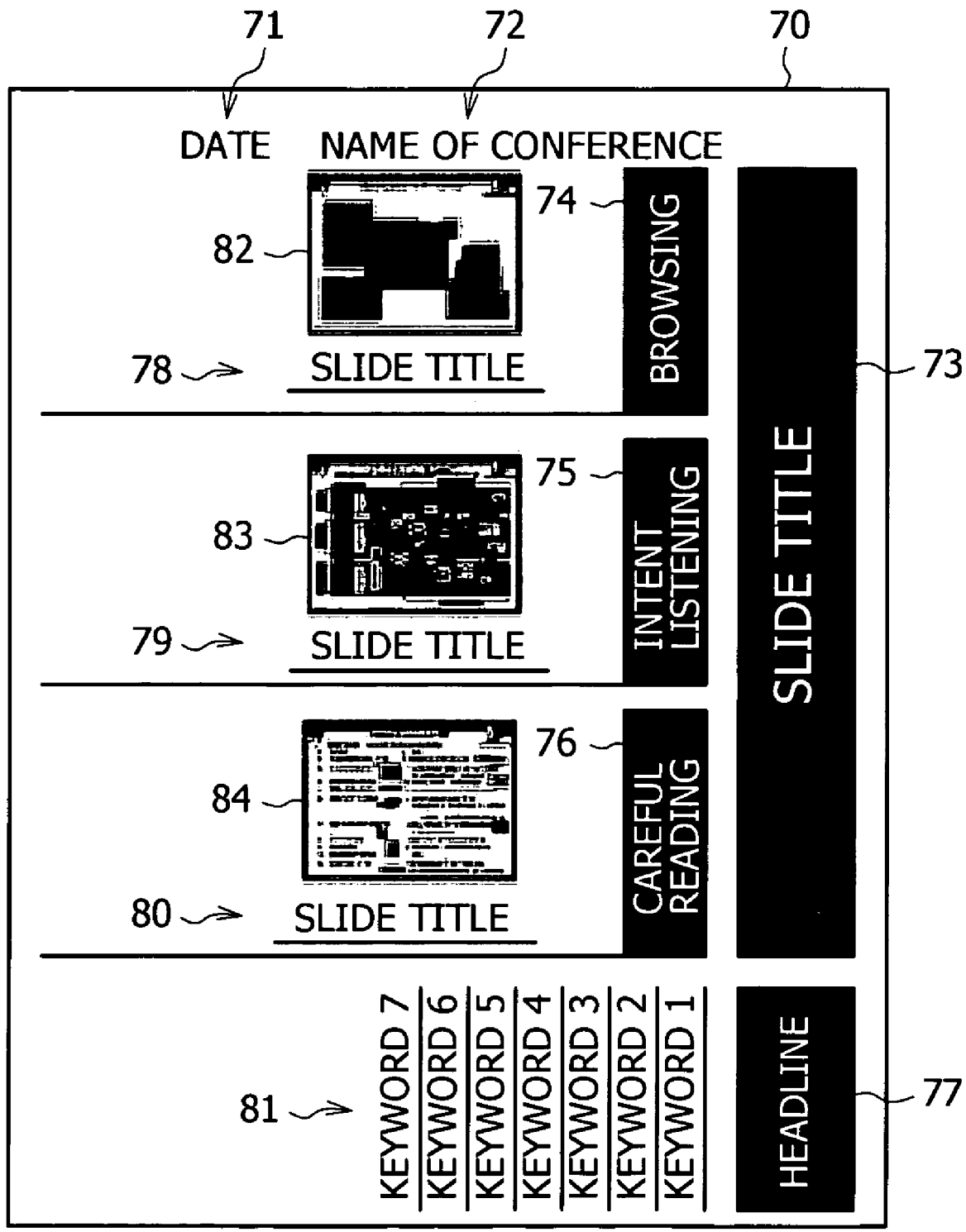
FIG. 15 is a diagram showing an example of a layout in vertical writing.
Figure 16C:
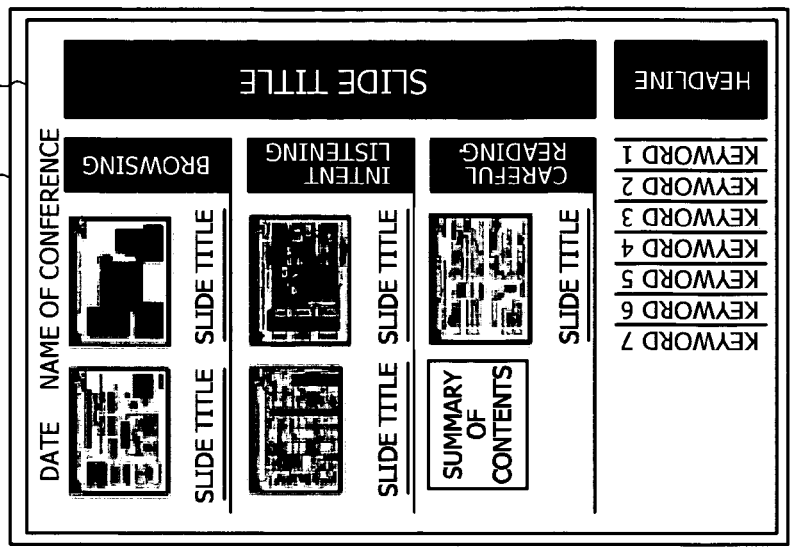
FIGS. 16A to 16C are diagrams showing examples of layouts in accordance with screen size.
Figure 16B:
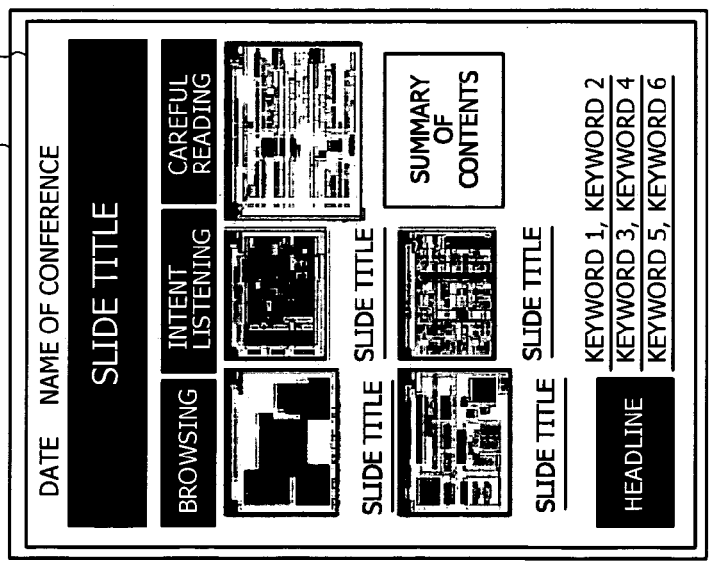
Figure 16A:
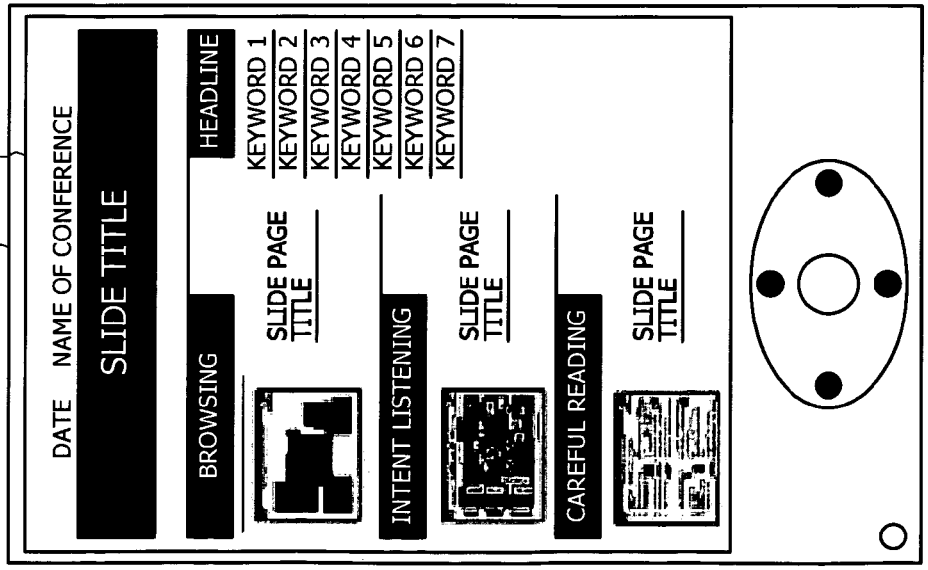

A method of deciding the slide selection order in the same quadrant will be described. FIG. 12 is a diagram showing a method of deciding the slide selection order in the same quadrant. FIG. 14 is a diagram showing a layout example in horizontal writing. FIG. 15 is a diagram showing a layout example in vertical writing. FIGS. 16A to 16C are diagrams showing a layout example in accordance with screen size. To generate a summary based on the layouts shown in FIGS. 14, 15 and 16A to 16C from the categorized result based on the contents of a slide shown in FIG. 11, when including plural slides in each categorized item when categorizing each slide as four categorized items of browsing, intent listening, careful reading, and keyword, the slide display 33 decides the slide selection order in decreasing order of the area of a rectangle in which the slide mapping coordinates are at the opposite angle with respect to the origin.

In FIG. 12, the "browsing" quadrant includes two slides A and B and the coordinates are A (x1, Y1) and B (x2, Y2).

When |x1|×|y1|<|x2|×|y2|, the selection order is B and A.
When |x1|×|y1|>|x2|×|y2|, the selection order is A and B.
When |x1|×|y1|=|x2|×|y2|, the slide is selected in increasing order of slide number. For example, when the slide A is slide No. 3 and the slide B is slide No. 5, the selection order is A and B.

Figures 13A, 13B:
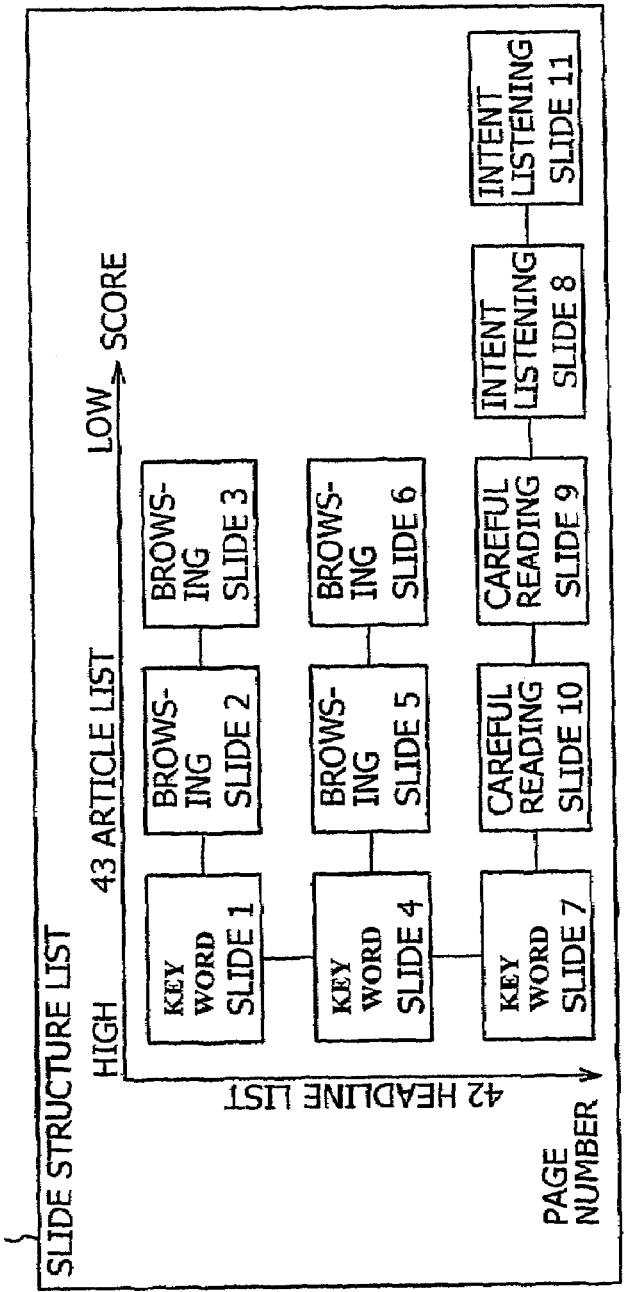
FIGS. 13A and 13B are diagrams of assistance in explaining examples of slide structuring based on categorization.

FIGS. 13A and 13B are diagrams of assistance in explaining examples of slide structuring based on categorization, in which FIG. 13A is a diagram showing browse types by slide and scores in the browse types and FIG. 13B is a diagram showing a slide structure list 41. The slide categorizing unit 31 computes browse type by slide and a score in the browse type. FIG. 13A shows an example in which the slide categorizing unit 31 computes browse types by slide and scores in the browse types. In the slide S1, the browse type is "keyword" and the score in the browse type is "0". In the slide S11, the browse type is "intent listening" and a score in the browse type is "254.0". The slide structure list 41 shown in FIG. 13B has a headline list 42 listing slides categorized as "keyword" as browse type in the displayed order in a presentation, and an article list 43 listing slides depending on the keyword slides are listed in score order from the keyword slides of the headline list 42.

The processing flow in which the slide structuring unit 32 generates the slide structure list 41 will be described using FIGS. 13A and 13B.

(1) The slide structuring unit 32 searches browse type categorized by the slide categorizing unit 31 to extract slides categorized as "keyword".

(2) The slide structuring unit 32 lists the extracted keyword slides in used order in a presentation to create the headline list 42.

(3) The slide structuring unit 32 extracts slides displayed between keyword slides included in the headline list 42 created in (2) and the next keyword slide in displayed order in the presentation.

(4) The slide structuring unit 32 sorts the slides extracted in (3) for the keyword included in the headline list 42 in descending order in accordance with scores in the browse type.

(5) The slide structuring unit 32 links the slides sorted in descending order in (4) to the keywords of the headline list 42 created in (2) to create the article list 43.

The headline list 42 may include, of all the slides, only the slides categorized as keyword. The article list 43 may include, of all the slides, the slides categorized as keyword included in the headline list 42 and only the slides categorized as non-keyword included for the next slide categorized as keyword. The article list 43 lists the slides included in the list as elements in descending order in accordance with the scores in a browse type. The slide structuring unit 32 links the slides categorized as keyword included in the headline list 42 to the list of the slides categorized as non-keyword included between keywords included in the article list 43 to generate a two-dimensional list.

The layout example in horizontal writing will be described using FIG. 14. A display screen 50 of the display device displays a date 51, the name of a conference 52, a slide title 53 as a main headline, as categorized items as sub-headlines, browsing 54, intent listening 55, careful reading 56, a headline 57, a slide page title 58 in the browsing 54, a slide page title 59 in the intent listening 55, a slide page title 60 in the careful reading 56, keywords 61 in the headline 57, a slide image reduced image (thumbnail) 62 in the browse 54, a slide image reduced image 63 in the intent listening 55, and a slide image reduced image 64 in the careful reading 56. Slides can be easily listed by hierarchical expression with a main headline, sub-headlines and a slide image using newspaper as metaphor. The user can view slides in accordance with category.

The layout example in vertical writing will be described using FIG. 15. A display screen 70 includes a date 71, the name of a conference 72, a slide title 73 as a main headline, as categorized items as sub-headlines, browsing 74, intent listening 75, careful reading 76, a headline 77, a slide title 78 in the browsing 74, a slide title 79 in the intent listening 75, a slide title 80 in the careful reading 76, keywords 81 in the headline 77, a slide image reduced image (thumbnail) 82 in the browsing 74, a slide image reduced image 83 in the intent listening 75, and a slide image reduced image 84 in the careful reading 76. Slides can be easily listed by hierarchical expression with a headline, sub-headlines and a slide image using newspaper as metaphor. The user can view slides in accordance with category. An English slide may be laid out in horizontal writing as shown in FIG. 14. A Japanese slide may be laid out in vertical writing as shown in FIG. 15.

The layout examples according to screen size will be described using FIGS. 16A to 16C. FIG. 16A is a diagram showing a layout example of a PDA. FIG. 16B is a diagram showing a layout example of a desktop. FIG. 16C is a diagram showing a layout example of a large size monitor such as a plasma display panel. A portable terminal 90 such as a PDA and a cellular phone is carried by an individual user and is mainly used outside the office. It has a small display region 91 of about 4 inches. A desktop monitor 100 connected to a desktop PC is mainly used in the office for deskwork. It has a medium display region 101 of about 15 to 24 inches. A large monitor 110 such as a plasma display panel (PDP) has a large display region 111 of about 40 to 60 inches.

As shown in FIG. 16A, the slide display 33 displays only the first slide and its title in accordance with the selection order explained in FIG. 12 for browsing, intent listening and careful reading for a portable terminal. The slide display 33 displays the second and third slides in the vertical direction and can easily implement that the user uses a scroll function of a portable terminal to lay out these for browsing. As shown in FIGS. 16B and 16C, the slide display 33 has a large display region in the desktop monitor 100 and the large monitor such as a plasma display panel 110 and displays the first and second slides and their titles for items of browsing, intent listening and careful reading.

The slide display 33 displays the third slide and later to lay out them for browsing by scroll. The slide display 33 can display a slide categorized as "careful reading" added with the summary of the contents of the slide for the desktop monitor and large monitor such as a plasma display panel. In the summary of the contents, the registered summary can be displayed and the automatic summarized result generated using the natural-language processing technique by the size correcting unit 35 can be used.

An example in which the slide contents summary apparatus according to this embodiment having plural sets of slides is applied will be described. FIG. 17 is a diagram showing an example in which plural sets of slides are laid out. The numeral 120 denotes a display region. An example in which plural sets of slides are laid out will be shown using FIG. 17. By way of example, four slide sets A, B, C and D each having plural pages are supposed. The time deviation computer 22 recomputes the deviation of explanation time by page in each slide by slide page using total explanation time obtained by totalizing total explanation time of each of the four slide sets A, B, C and D.

When the slide sets A, B, C and D as one slide set are provided to the slide contents summary apparatus 3, the slide categorizing unit 31 categorizes all the slides A, B, C and D. As shown in FIG. 17, the slide display 33 lays out plural sets of slides. The slide sets are categorized on database DB by theme and can be used as visual index that summarizes the contents of the database DB.

An example of a structured slide view 129 uses the slides structured by the slide structuring unit 32 to display the slides in a structure manner. FIG. 18 is a diagram showing an example of the structured slide view 129. The structuring layout unit 36 uses slides structured by the slide structuring unit 32 to generate information for displaying the structured slide view 129 displaying the slides in a structure manner. The structured slide view 129 has a headline view 130 and an article view 140 and visualizes the slide structure list 41 described in FIGS. 13A and 13B. The headline view 130 includes a date 131, a slide title 132, browse types 133 to 135, headline titles 136 to 138, and a slider bar 139. The article view 140 includes browse types 141 to 143, slide titles 144 and 145, a return button 146, and a slider bar 147.

The headline view 130 extracts and lists the headlines of the slide structure list 41 generated by the slide structuring unit 32. When clicking an arbitrary headline displayed by the headline view 130, it is switched to the article view 140. The article view 140 extracts and lists the list of the slides linked to the selected headline from the slide structure list 41. When returning from the article view 140 to the headline view 130, the "return" button 146 is pressed.

FIG. 19 is a diagram of assistance in explaining an example in which recommendation of the viewing method is added to the slide list. There is shown an example in which when listing slides used in a presentation or conference, the reduced image of a slide, the title of the slide, and browse type of the slide are described together to list all slides from the first to last pages. A slide list 150 includes slide reduced images 151 to 153, slide titles 154 to 156, browse types 157 to 159, importance 160 to 162, and a slider bar 163. The slide importance 160 to 162 can be computed using importance of the slide categorized by the slide categorizing unit 31. The slide categorizing unit 31 computes browse type of each slide and an importance score. When sorting the slides in descending order of the importance score, the slides can be arranged in order of importance.

When five slides are categorized as "browsing" and the score of a currently displayed slide is the third, the slide importance is ⅗×100 (%)=60 (%). In this list display, the user can easily list all the slides used in a presentation or conference by scrolling the list and can select the slides required to be viewed, with reference to the title, browse type and importance of each slide.

As modifications of this embodiment, it is possible to list slides based on the amount of information in accordance with screen size by changing the combination of items displaying a list based on the combination of slide reduced image, browse type and importance, a list based on the combination of slide number, slide title, browse type and importance, a list based on the combination of slide reduced image, slide title and importance, a list based on the combination of slide reduced image and importance, a list based on the combination of slide reduced image and browse type, and a list based on slide reduced image and importance.

An example in which the browsing method is recommended at browse of presentation record will be described. FIG. 20 is a diagram showing an example of a browse viewer 181 that recommends the browsing method at browsing of presentation record recorded by the presentation recorder 2. FIG. 20 shows a function arrangement example of the browse viewer 181. A slide viewer 182, a previous slide button 183, a slide header button 184, a next slide button 185, a slide end button 186, a browse type indicator 187, and an importance indicator 188 are arranged on the browse viewer 181.

The browse viewer 181 displays an overall diagram of a browsed slide. The numerals 183 to 186 denote slide control buttons controlling a slide. The previous slide button 183 displays the previous slide of the currently displayed slide on the slide viewer 182. The next slide button 185 displays the next slide of the currently displayed slide on the slide viewer 182. The slide header button 184 displays the first page of the slide. The slide end button 186 displays the last page of the slide. The browse type indicator 187 displays the type of the slide categorized by the slide categorizing unit 31.

The importance indicator 188 displays importance of the slide categorized by the slide categorizing unit 31. The slide categorizing unit 31 computes the browse type by slide and the importance score. When sorting the slides in descending order of the importance score, the slides can be arranged in order of importance. The importance indicator computes and displays importance using the order of the slides sorted in descending order. When five slides are categorized as "browsing" and the score of the currently displayed slide is the third, ⅗×100 (%)=60 (%) is displayed. Also if the score of the currently displayed slide is the first, ⅗×100 (%)=100 (%) is displayed. As shown by the importance indicator 188, display may be visually supplemented by a bar graph.

Using the browse viewer 181, the user can judge how a browsed slide may be viewed and can recognize the relative importance in its browse type. When viewing the contents of a slide, the user skips the slide having low importance or selects and views only the slides of the intent listening type so as to grasp the presentation and the contents of a conference in a short time. When browsing the slides of the presentation or the contents of a conference using a small device such as a PDA or a cellular phone outside the office, the user can skip a slide having a number of characters categorized as careful reading to view only the slides categorized as browsing or intent listening and check the slides as careful reading on the screen of a desktop PC in the office.

According to this embodiment, slides and audio used in a conference or presentation are recorded to automatically categorize the slides and audio recorded in the conference or presentation as plural browse types by page for showing the slides categorized by type to the audience. The slides categorized by type are shown in the column composition of headline, the summarized contents, thumbnail image of the slides like the layout of newspaper. When a viewer cannot take part in a conference or presentation, he/she can efficiently browse the slides to view the slides and audios.

The slide contents processing method according to the present invention is implemented using a CPU, a ROM, and a RAM. A program is installed from a hard disk drive or a portable recording medium such as a CD-ROM, a DVD or a flexible disk or is downloaded from a communication circuit. The CPU executes the program to implement the steps.

The program allows a computer to execute computing the deviation of explanation time of each slide to total explanation time of slides, computing the percentage of objects in the slide based on the number of objects by type in the slide, categorizing the slide based on the deviation of explanation time of the slide and the percentage of objects in the slide, and generating information for arranging and displaying the contents of the slide by item categorized by the categorizing. The page time recording unit 21 corresponds to a recording unit. The time deviation computer 22 corresponds to a computer. The object counter 23 corresponds to a counter. The object structure computer 24 corresponds to a percentage computer. The slide categorizing unit 31 corresponds to a categorizing unit. The slide display 33 corresponds to a display. The size correcting unit 35 corresponds to a correcting unit.

As mentioned before, a slide contents processor according to the present invention includes a computer that computes a deviation of explanation time of each slide to total explanation time of slides; a percentage computer that computes a percentage of objects in the slide based on the number of objects by type in the slide; and a categorizing unit that categorizes the slide based on the deviation of explanation time of the slide and the percentage of objects in the slide. According to an embodiment of the invention, the slide is categorized based on the deviation of explanation time of the slide and the percentage of the objects in the slide. A viewer can efficiently browse the slide in a short time.

The slide contents processor according to the present invention may further include a display that generates information that arranges and displays contents of the slide by item categorized by the categorizing unit. According to an embodiment of the invention, the contents of a slide are arranged and displayed by categorized item to provide display which can recognize categorization at a glance.

The slide contents processor according to the present invention may further include a recording unit that records explanation time of the slide. According to an embodiment of the invention, explanation time of the slide can be automatically recorded.

The slide contents processor according to the present invention may further include a counter that counts the number of objects in the slide by object type. According to an embodiment of the invention, the number of objects in each slide can be counted by object type.

The slide contents processor according to the present invention may further include a slide structuring unit that creates a headline list and an article list based on a browse type computed by the categorizing unit and a score in the browse type to structure the slide. The tendency to insert a slide categorized as keyword into the division of the contents in a presentation or conference is high. According to an embodiment of the invention, a headline list displaying only a keyword slide is linked to an article list extracting only slides related to the keyword slide included in the headline list to list the slides in descending order in accordance with the score in the browse type, so that presentation or conference slides can be efficiently viewed by division of the contents in order of importance.

The headline list may include, of all the slides, only slides categorized as keyword.

The article list may include, of all the slides, slides categorized as keyword included in the headline list and only slides categorized as non-keyword included for a next slide categorized as keyword. The article list may also list slides as elements included in the list in descending order in accordance with scores in the browse type.

The slide structuring unit may link a slide categorized as keyword included in the headline list to a list of slides categorized as non-keyword included between keywords included in the article list to generate a two-dimensional list. The object type may include at least any one of a text object, an image object, and a graphics object.

The percentage computer may categorize the slide as one of a text object and a non-text object to compute the percentage of objects in the slide. According to an embodiment of the invention, each slide can be categorized as text object or non-text object to easily compute the percentage of the objects in the slide. The non-text object includes a graphics object, an image object, a video object, an audio object, and a reference object.

The categorizing unit may categorize the slide as at least any one of browsing, careful reading, intent listening, and keyword. According to an embodiment of the invention, each slide is categorized as browsing, careful reading, intent listening, and keyword to be viewed in accordance with these categories.

The categorizing unit may assign the deviation of explanation time of each slide computed by the computer in a manner that with an origin of 50, a high deviation is assigned in a positive direction and a low deviation is assigned in a negative direction, compute a difference between the percentage of text objects and the percentage of non-text objects of the slide computed by the percentage computer, and assign, with an origin of 0, a text object to one pole and a non-text object to another pole. According to an embodiment of the invention, each slide can be categorized in accordance with the deviation of explanation time of the slide and the percentage of objects.

The categorizing unit may categorize, in the slide, to four quadrants of a two-dimensional plane constituted of two axes of the deviation of explanation time of the slide and the percentage of objects in the slide, a quadrant in which the deviation of explanation time of the slide is positive seen from the origin and the percentage of objects in the slide belongs to text as careful reading, a quadrant in which the deviation of explanation time of the slide is positive seen from the origin and the percentage of objects in the slide belongs to non-text as intent listening, a quadrant in which the deviation of explanation time of the slide is negative seen from the origin and the percentage of objects in the slide belongs to text as keyword, or a quadrant in which the deviation of explanation time of the slide is negative seen from the origin and the percentage of objects in the slide belongs to non-text as browsing.

The display may include a correcting unit that performs change of a layout, addition display of a slide, and addition display of a summary of the contents to the slide in accordance with a screen size of the display device. According to an embodiment of the invention, display in accordance with the size of the display region of the display device is enabled.

The display may display a headline of an item categorized by the categorizing unit. According to an embodiment of the invention, a keyword by categorized item is displayed to recognize the categorized item at a glance.

The headline of the item may include at least any one of browsing, careful reading, intent listening, and keyword. According to an embodiment of the invention, an interesting slide can be easily found by the headlines of four items of browsing, careful reading, intent listening, and keyword.

The contents of the slide may include at least one of a reduced image of the slide and a title of the slide. According to an embodiment of the invention, the headline of the categorized item and the reduced image of the slide or the title of the slide are displayed so that the user can efficiently view a necessary slide in a short time.

A slide contents processing method according to the present invention includes computing a deviation of explanation time of each slide to total explanation time of slides, computing a percentage of objects in the slide based on the number of objects by type in the slide, and categorizing the slide based on the deviation of explanation time of the slide and the percentage of objects in the slide. According to an embodiment of the invention, the slide is categorized based on the deviation of explanation time of the slide and the percentage of objects in the slide so that the viewer can efficiently view a slide in a short time.

The slide contents processing method may further include generating information that arranges and displays contents of the slide by item categorized by the categorizing. According to an embodiment of the invention, the contents of a slide are arranged and displayed by categorized item to provide display which can recognize categorization at a glance.

A storage medium readable by a computer storing a program of instructions executable by the computer to perform a function includes computing a deviation of explanation time of each slide to total explanation time of slides, computing a percentage of objects in the slide based on the number of objects by type in the slide, and categorizing the slide based on the deviation of explanation time of the slide and the percentage of objects in the slide. According to an embodiment of the invention, the slide is categorized based on the deviation of explanation time of the slide and the percentage of objects in the slide so that the viewer can efficiently view a slide in a short time.

The storage medium readable by a computer storing a program may further allow the computer to execute generating information that arranges and displays contents of the slide by item categorized by the categorizing. According to an embodiment of the invention, the contents of a slide are arranged and displayed by categorized item to provide display which can recognize categorization at a glance.

According to an embodiment of the invention, a slide contents processor, a slide contents processing method, and a program which can efficiently browse a slide in a short time can be provided.

The embodiments of the present invention are described above in detail. The present invention is not limited to such specific embodiments. Various modifications and changes can be made in the scope of the purpose of the present invention described in claims. The present invention is not limited to a conference or presentation and can be used in various applications for education and entertainment.

The entire disclosure of Japanese Patent Application No. 2004-289363 filed on Sep. 30, 2004 including specification, claims, drawings and abstract is incorporated herein by reference in its entirety.

What is claimed is:

1. A slide contents processor comprising:
a time deviation computer which computes a deviation of a time of an explanation length of a slide in a presentation with respect to a total time of an explanation length of all slides in the presentation;
a percentage computer which computes a percentage of text objects in the slide and a percentage of non-text objects in the slide;
a categorizing unit that categorizes the slide as one of a plurality of slide types based on the computed deviation and the computed percentages of text objects and non-text objects in the slide; and
a display which arranges and displays the slide according to the one of the plurality of slide types determined by the categorizing unit.

2. The slide contents processor according to claim 1, further comprising:
a recording unit which records an explanation time of each slide.

3. The slide contents processor according to claim 1, further comprising:
a counter which counts a number of objects in the slide by object type.

4. The slide contents processor according to claim 1, wherein the categorizing unit computes a slide type of the slide and a score of the slide type of the slide,
wherein the score indicates a strength of correlation of the slide to the computed slide type, and
wherein the slide contents processor further comprises a slide structuring unit which creates a headline list and an article list based on computed slide types and computed scores of slides in the presentation to organize the presentation.

5. The slide contents processor according to claim 4, wherein the headline list includes only slides categorized as keyword.

6. The slide contents processor according to claim 4, wherein the headline list is an ordered list of slides categorized as keyword among the slides in the presentation, and wherein the article list includes the slides categorized as keyword included in the headline list and, for each of the slides categorized as keyword, slides that are not categorized as keyword appearing in the presentation after a slide categorized as keyword to a next slide categorized as keyword appearing in the presentation.

7. The slide contents processor according to claim 4, wherein the article list lists slides that are not categorized as keyword in descending order by score in the slide type.

8. The slide contents processor according to claim 4, wherein the slide structuring unit links a slide categorized as keyword included in the headline list to a list of slides that are not categorized as keyword displayed in the presentation between the slide categorized as keyword in the presentation and a next slide categorized as keyword in the presentation to generate a two-dimensional list.

9. The slide contents processor according to claim 3, wherein the object type includes at least any one of a text object, an image object, and a graphics object.

10. The slide contents processor according to claim 1, wherein the categorizing unit categorizes objects in the slide as one of a text object and a non text object to compute the percentage of text objects and the percentage of non-text objects in the slide.

11. The slide contents processor according to claim 1, wherein the categorizing unit categorizes the slide as at least one of the plurality of slide types, the plurality of slide types including a browsing type slide, a careful reading type slide, an intent listening type slide, and a keyword type slide.

12. The slide contents processor according to claim 1, wherein the categorizing unit assigns the computed deviation of the slide to a horizontal axis of a two-dimensional plane, assigns a difference between the computed percentage of text objects and the computed percentage of non-text objects of the slide to a vertical axis of the two-dimensional plane, and assigns an origin of the two-dimensional plane a value of 0 along the vertical axis and a value of 50 along the horizontal axis.

13. The slide contents processor according to claim 12, wherein the categorizing unit categorizes the slide into one of four quadrants of the two-dimensional plane,
wherein a first quadrant of the four quadrants, in which the deviation of explanation time is positive as seen from the origin and the difference between the percentage of text objects and the percentage of non-text objects of the slide is positive as seen from the origin, is classified as a careful reading quadrant,
wherein a second quadrant of the four quadrants, in which the deviation of explanation time is positive as seen from the origin and the difference between the percentage of text objects and the percentage of non-text objects of the slide is negative as seen from the origin, is classified as an intent listening quadrant,
wherein a third quadrant of the four quadrants, in which the deviation of explanation time is negative as seen from the origin and the difference between the percentage of text objects and the percentage of non-text objects of the slide is positive as seen from the origin, is classified as a keyword quadrant, and
wherein a fourth quadrant of the four quadrants, in which the deviation of explanation time is negative seen from the origin and the difference between the percentage of text objects and the percentage of non-text objects of the slide is negative as seen from the origin, is classified as a browsing quadrant.

14. The slide contents processor according to claim 1, wherein the display includes a correcting unit which changes a layout of the slide in accordance with a screen size of the display.

15. The slide contents processor according to claim 1, wherein the display displays a headline of an item categorized by the categorizing unit.

16. The slide contents processor according to claim 15, wherein the headline of the item includes at least any one of browsing, careful reading, intent listening, and keyword.

17. The slide contents processor according to claim 1, wherein contents of the slide includes at least one of a reduced image of the slide and a title of the slide.

18. The slide contents processor according to claim 1, wherein the time of the explanation length of the slide is a time difference between an explanation start time of the slide and an explanation end time of the slide.

19. The slide contents processor according to claim 1, wherein the time deviation computer computes the deviation with respect to an average explanation time for all slides in the presentation and a standard deviation of explanation time of all slides in the presentation.

20. The slide contents processor according to claim 1, wherein the deviation is computed as:

[(time of the explanation length of the slide)−(time of average explanation length of all slides in the presentation)/standard deviation]×10+50.

21. A slide contents processing method comprising:

computing a deviation of a time of an explanation length of a slide in a presentation with respect to a total time of an explanation length of all slides in the presentation;

computing a percentage of text objects in the slide and a percentage of non-text objects in the slide;

categorizing the slide as one of a plurality of slide types based on the computed deviation and the computed percentages of text objects and non-text objects in the slide; and arranging and displaying the slide on a display according to the one of the plurality of slide types.

22. A computer-readable storage medium having embodied thereon a program, which when executed by a computer causes the computer to execute a slide contents processing method, the method comprising:

computing a deviation of a time of an explanation length of a slide in a presentation with respect to a total time of an explanation length of all slides in the presentation;

computing a percentage of text objects in the slide and a percentage of non-text objects in the slide;

categorizing the slide as one of a plurality of slide types based on the computed deviation and the computed percentages of text objects and non-text objects in the slide; and arranging and displaying contents of the slide according to the one of the plurality of slide types.

23. A slide contents processor comprising:

a first computer which analyzes a plurality of types of objects within a presentation slide to obtain a percentage of each of the plurality of types of objects in the presentation slide;

a second computer which computes a deviation of a time of an explanation length of the presentation slide with respect to a total time of an explanation length of all slides in the presentation;

a categorizing unit which categorizes the presentation slide as one of a plurality of slide types based on the percentage of each of the plurality of types of objects in the presentation slide and the computed deviation, the plurality of slide types respectively associated with one of four quadrants of a two-dimensional plane, and the presentation slide displayed in one of the four quadrants associated with the one of the plurality of slide types to which the presentation slide is categorized; and a display which arranges and displays the presentation slide in the one of the four quadrants according to the one of the plurality of slide types determined by the categorizing unit.

* * * * *